(12) United States Patent
Fitzsimmons

(10) Patent No.: US 9,772,015 B2
(45) Date of Patent: Sep. 26, 2017

(54) LINEAR POWERED INPUT DEVICE

(71) Applicant: John P Fitzsimmons, Redmond, OR (US)

(72) Inventor: John P Fitzsimmons, Redmond, OR (US)

(73) Assignee: LPID LLC, Redmond, OR (US)

( * ) Notice: Subject to any disclaimer, the term of this patent is extended or adjusted under 35 U.S.C. 154(b) by 89 days.

(21) Appl. No.: 14/939,870

(22) Filed: Nov. 12, 2015

(65) Prior Publication Data
US 2017/0138452 A1    May 18, 2017

(51) Int. Cl.
| | |
|---|---|
| *F16H 19/06* | (2006.01) |
| *F16H 37/00* | (2006.01) |
| *F16H 31/00* | (2006.01) |
| *A63B 22/00* | (2006.01) |
| *B62M 3/00* | (2006.01) |
| *F16H 37/12* | (2006.01) |

(52) U.S. Cl.
CPC ........... *F16H 31/001* (2013.01); *A63B 22/00* (2013.01); *B62M 3/00* (2013.01); *F16H 37/122* (2013.01); *F16H 2019/0681* (2013.01)

(58) Field of Classification Search
CPC .. F16H 19/06; F16H 21/02; F16H 2019/0686; F16H 2019/0681; F16H 37/124; F16H 37/126; F16H 37/122; F16H 37/14; F16H 31/001; B62M 1/28; B62M 1/12
See application file for complete search history.

(56) References Cited

U.S. PATENT DOCUMENTS

| | | | | |
|---|---|---|---|---|
| 326,247 | A * | 9/1885 | Root | A63B 21/00178 482/131 |
| 4,923,193 | A * | 5/1990 | Pitzen | A63B 23/03575 482/5 |
| 5,542,893 | A * | 8/1996 | Petersen | A63B 21/157 280/245 |
| 5,653,663 | A * | 8/1997 | McCahon | B62K 3/005 280/245 |
| 7,775,942 | B2 * | 8/2010 | Hildebrandt | A63B 21/154 482/52 |

* cited by examiner

*Primary Examiner* — Jake Cook
(74) *Attorney, Agent, or Firm* — Cislo & Thomas LLP

(57) ABSTRACT

A linear powered input device that utilizes linear input from a user and converts the linear input rotational energy to perform work. The linear input is generated by lever arms having a slotted attachment at a pivot point that allows a free end of the lever arms to move linearly rather than in an arcuate path. The lever arms are connected to a power transmission mechanism that wraps around one or more drive wheels having one-way bearings mounted on one or more output shafts. The output shafts can be connected to any type of auxiliary device to perform the desired work. Output wheels may be mounted on the output shafts and operatively connected by a transmission link that allows linear motion of any lever arm in any allowable direction to cause the output shaft to rotate in the same rotational direction so as to receive continuous input.

9 Claims, 13 Drawing Sheets

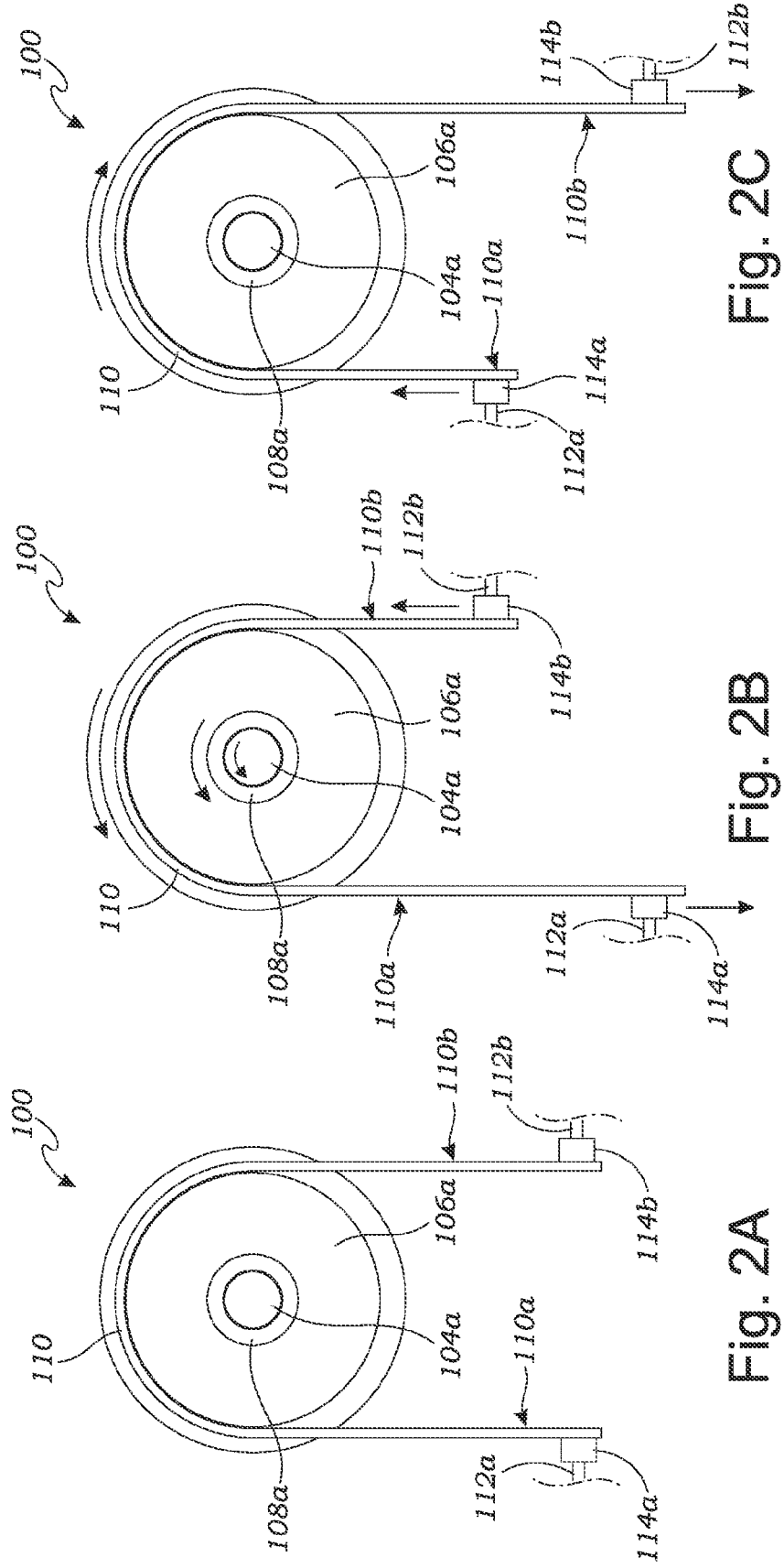

LINEAR POWERED INPUT DEVICE

TECHNICAL FIELD

This invention relates to methods and devices for generating energy using linear input.

BACKGROUND

The transfer of human force input on a typical crank type device is inefficient due to the crank type device not transferring all the force input to the rotational output. Human input onto crank arms can be in the form of muscle exertion and gravitational forces of the human mass onto crank arms. In the pure form a force is applied to a crank type device in one rotational direction. The only time the three is applied at 100 percent is when the force is applied at a 90 degree angle to the lever position. When the force is applied at a 0 degree angle, 0 percent of the force is applied to rotation. FIG. 1 demonstrates the concept of the force distribution on a bicycle crank in which the force is applied from the top towards the bottom.

As shown in FIG. 1, when the lever position (LP) is directly above the crank (referred to as the zero position), the potential energy (P) in the downward direction is at 100 percent. However, since the lever rotates rather than sliding up and down, the kinetic energy (K) is zero as there is no movement in the downward direction. As the lever position rotates 22.5 degrees counterclockwise, the potential energy of the downward force is at approximately 75% and the kinetic energy is at approximately 25%. As the lever position continues to rotate counterclockwise to 45 degrees, the potential energy decreases to approximately 50 percent while the kinetic energy increases to approximately 50 percent. When the lever position reaches a 90 degree angle relative to the application of force, the potential energy is at 0 percent and the kinetic energy reaches its maximum 100 percent. As rotation continues in the counterclockwise direction the lever position reaches 135 degrees where the potential energy increases to approximately 50 percent and the kinetic energy decreases to approximately 50 percent. When the lever position is at its lowest point at 180 degrees, the kinetic energy reaches its minimum 0 percent. Therefore, a rotating crank assembly does not maximize the available kinetic energy throughout most of its movement.

Rotating crank arms waste a lot of the energy from muscle exertion and gravitational forces because the energy is dissipated into different directions. Due to the inefficiencies of existing cranking devices, there is still a need for efficient cranking devices.

SUMMARY

The linear powered input devices of the present invention improve efficiency by applying the input force in a purely linear direction as opposed to a rotational direction. This allows 100 percent of the force to be directed in a single direction to assure that the maximum input energy on the output load is applied through the entire range of motion of the lever arms, and not just at a single point. Thus, the only loss of force is in the resistance encountered in the device, for example, from bearings of either the one way or two way types. The only time a device of the present invention is not applying 100 percent of the input force is when the lever arm hits its linear end limit where it needs to reverse directions.

The present invention comprises a frame upon which the components are mounted, a lever arm for the user to input energy in a linear direction, a power transmission mechanism to transmit the power from the lever arms to a drive wheel mounted on an output shaft to convert linear input energy to rotational energy. The output shaft may be connected to any type of load to perform work of any kind. The drive wheel may be mounted on the output shaft via a one-way bearing so as to impart rotational force only in one direction, and freewheel in the opposite rotational direction.

Idler wheels may be used so that the power transmission mechanism can be an infinite or continuous loop. The idler wheels also contribute in determining the length of the transmission mechanism, which determines the length of the stroke of a lever arm.

Output wheels may also be used to connect multiple driver wheels with one-way bearings mounted on their respective output shafts so that bidirectional movement of the lever arms provides constant input to the output shafts. Traditional crank type devices, however, require a half a revolution of the crank device before the lever arm can be used to transmit power again.

Some of the devices produce a rotational output in line with the human force input, while some will produce rotational output perpendicular to the human. Some embodiments could be used either way. Some of the devices would be best suited for input from leg power, while others can be configured to be powered by the arms, and others can be powered by the legs, the arms, or both the legs and the arms.

Power applied to lever arms can be transmitted to the output load using ropes, chains, gears, sprockets, and the like. These devices can be implemented in many different applications, such as 3 or 4 wheeled human powered cycles, rickshaws, small generators, transportation devices for physically restricted people, power to move water from a well, grinding grain, or any activity where a rotational force could be useful in improving the functions of everyday life. The devices of the present invention could replace the crank type inputs and be much more efficient in transferring the force applied into rotational force.

The different embodiments can be combined in a variety of combinations to create new embodiments. For instance one of the embodiments applies three different designs so leg power can be used with two-way or one-way input with either or both arms. The different ways output wheels are operatively connected to each other can be interchangeable between the embodiments.

BRIEF DESCRIPTION OF DRAWINGS

FIGS. 2A-2C show elevation views of an embodiment of the present invention.

DETAILED DESCRIPTION OF THE INVENTION

Figure 1:
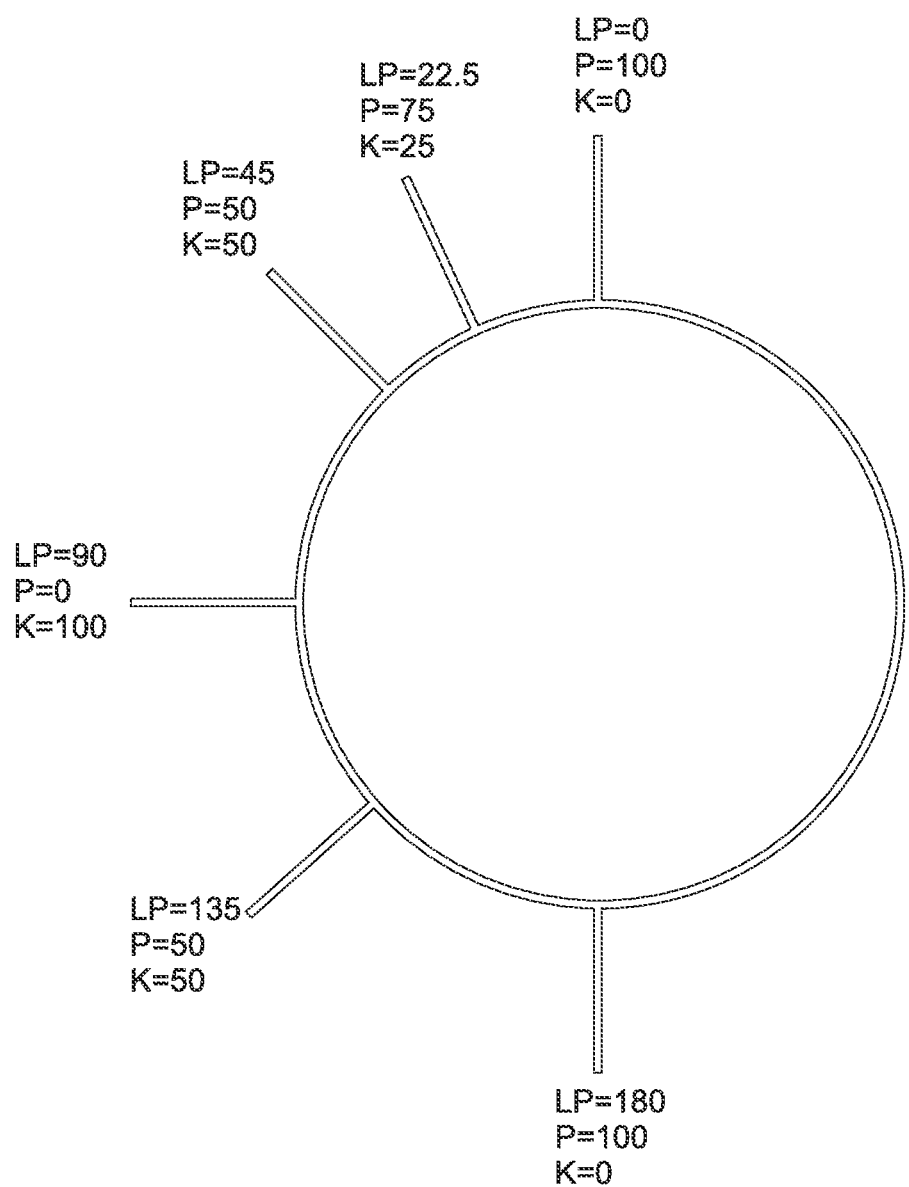
FIG. 1 shows a diagram of the amount of potential and kinetic energy imparted on a rotating crank arms as they cycle.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Traditional human powered devices, such as bicycles, hand cranks, and the like, utilize circular motion on crank arms to generate output to a load. Therefore, maximum force is not applied to the crank arms through their entire range of motion, but rather, only when the direction of movement of the crank arms are parallel to the direction of the force. This tends to be a single point in the entire 360 degree revolution of the crank arm.

The linear powered input device 100 of the present invention, however, utilizes maximum power through the entire range of motion of each lever arm because the present invention uses human power in a purely linear direction to generate output to a load 10. Therefore, the device 100 can be configured so that the direction of the force applied is always in a direction the lever arm is moving. For example, on a typical two-dimensional coordinate plane, where the X coordinate represents the ground, all motion of the lever arms where the force is applied is purely in the Y direction. Therefore, none of the force is lost in the X direction through the entire range of motion. In typical human powered crank-type devices, all power is purely in the Y direction only at a single point when the crank arm is parallel to the X coordinate.

With reference to the figures, generally, the linear powered input device 100, comprises a frame 102; an output shaft 104a rotatably mounted on the frame 102; a drive wheel 106a mounted on the output shaft 104a; a one-way bearing 108a operatively connected to the drive wheel 106a and the output shaft 104a; and a power transmission mechanism 110 operatively connected to the drive wheel 106a. In the preferred embodiment, the linear powered input device 100 further comprises at least one lever arm 112a operatively attached to the frame 102 and the power transmission mechanism 110.

The lever arm 112a is attached to the frame 102 and the power transmission mechanism 110 in such a manner that force is applied to the lever arm 112a in a purely linear motion, rather than rotational motion, to impart force on the power transmission mechanism 110.

In general, the drive wheel 106a defines a first plane of rotation and has a diameter. The drive wheel 106a, the one-way bearing 108a, and the output shaft 104a are arranged such that rotation of the drive wheel 106a in a first rotational direction causes rotation of the output shaft 104a in the first rotational direction, and rotation of the drive wheel 106a in a second rotational direction opposite the first rotational direction does not cause rotation of the output shaft 104a in the second rotational direction. Therefore, the one-way bearing 108a is a form of one-way clutch, ratchet and pawl, and the like that allows the drive wheel 106a to engage the output shaft 104a in the first rotational direction and freewheel in the opposite rotational direction.

The power transmission mechanism 110 is operatively connected to the drive wheel 106a. Portions of the power transmission mechanism 110 attached to the lever arms move in a linear direction to cause the drive wheel 106a to turn in a first rotational direction or a second rotational direction depending on which direction the power transmission mechanism 110 is being forced. As such, the power transmission mechanism 110 may be a chain, a belt, a rope, a band, a rack, a slide, and the like.

With reference to FIGS. 2A-2C, in some embodiments, the power transmission mechanism 110 wraps around the drive wheel 106a such that a first portion of the power transmission mechanism 110a hangs vertically on one side of the drive wheel 106a, and a second portion of the power transmission mechanism 110b hangs on the opposite side of the drive wheel 106a. The frame 102 has been removed for clarity, but any type of frame 102 can be used depending on the application.

In this arrangement, as shown in FIG. 2B, when the first portion of the power transmission mechanism 110a is forced downwardly in a first linear direction, the drive wheel 106a rotates in the first rotational direction (in this example, counterclockwise). In this configuration, the drive wheel 106a engages the one-way bearing 108a causing it to rotate in the first rotational direction. Rotation of the one-way bearing 108a in the first rotational direction engages the output shaft 104a and causes the output shaft 104a to rotate in the first rotational direction. In the meanwhile, this configuration causes the second portion of the power transmission mechanism 110b to move upwardly in a second linear direction opposite the first linear direction so as to position the second portion of the power transmission mechanism 110b to be forced downwardly.

As shown in FIG. 2C, when the second portion of the power transmission mechanism 110b is forced downwardly in the first linear direction, the drive wheel 106a rotates in the second rotational direction (in this example, clockwise), and the first portion of the power transmission mechanism 110a moves upwardly in the second linear direction. Due to the one-way bearing 108a, however, the drive wheel 106a does not engage the output shaft 104a, and therefore, the output shaft 104a does not rotate with the drive wheel 106a in the second rotational direction. In other words, the drive wheel 106a is allowed to freewheel in this direction. Therefore, in this embodiment, only the downward movement of the first portion of the power transmission mechanism 110a drives the output shaft 104a. The one-way bearing 108a allows the first portion of the power transmission mechanism 110a to be reset so that the first portion of the power transmission mechanism 110a can drive the output shaft 104a again. Therefore, a first portion of the first power transmission mechanism 110a moving in a first linear direction causes the first drive wheel 106a and the first output shaft 104a to move in the first rotational direction, and the first portion of the power transmission mechanism 110a moving in a second linear direction opposite the first linear direction, does not cause the output shaft 104a to move in the second rotational direction.

A lever connector 114a may be attached to the first portion of the power transmission mechanism 110a. A lever 112a may be attached to the lever connector 114a so that force can be more easily applied in the first direction. In some embodiments, a second lever connector 114b may be attached to a second portion of the power transmission mechanism 110b.

Figure 3A:
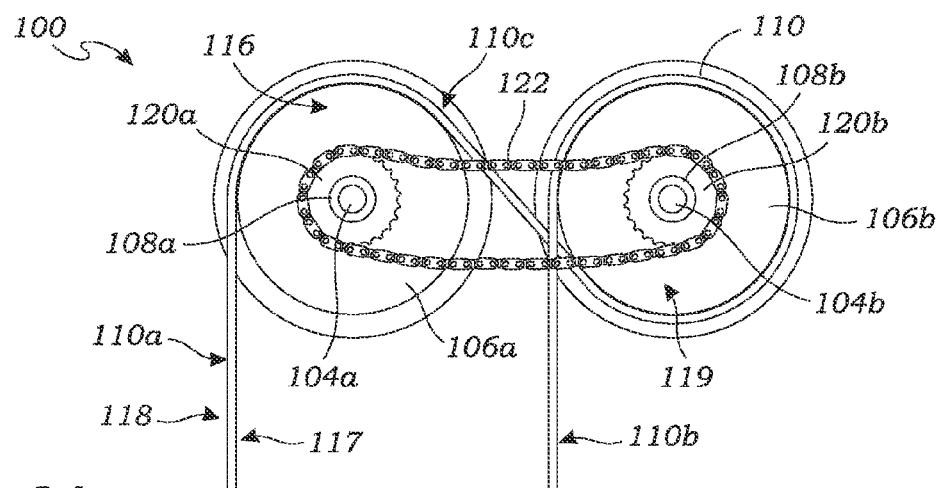
FIGS. 3A-3C show elevation views of another embodiment of the present invention.
Figure 3B:
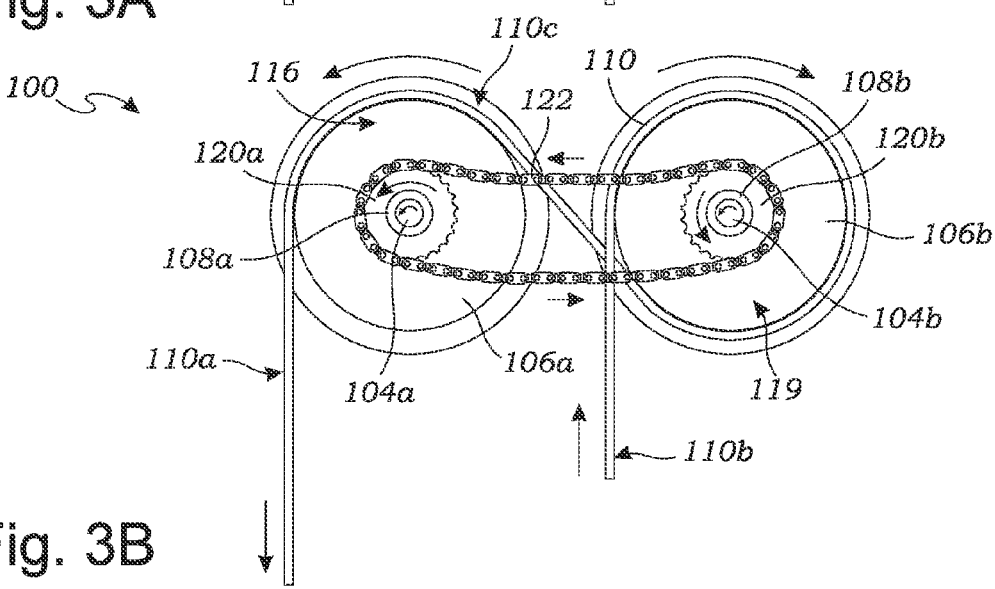
Figure 3C:
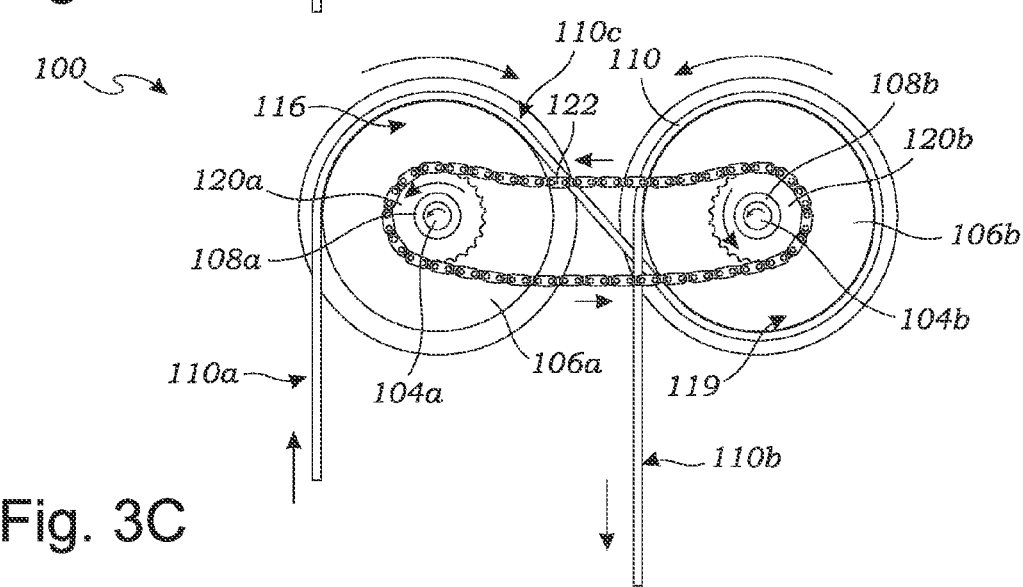

To allow the second portion of the power transmission mechanism 110b to also contribute to the output shaft 104a when forced in the first linear direction, a second drive wheel 106b with a second one-way bearing 108b mounted on a second output shaft 104b may be used as shown in FIGS. 3A-3C. Again, the frame 102 is not shown for clarity.

In some embodiments, the linear powered input device 100, further comprises a second drive wheel 106b having a second one-way bearing 108b, the second drive wheel 106b defining a second diameter and rotatable in the first plane of rotation. The second drive wheel 106b may be mounted on a second output shaft 104b, and the power transmission mechanism 110 may be operatively connected to the second drive wheel 106b. The first and second output shafts 104a, 104b may be parallel to each other and spaced apart from each other a certain distance. In some embodiments, the power transmission mechanism 110 wraps around the first drive wheel 106a along a top portion 116 of the first drive wheel 106a, and the power transmission mechanism 110 wraps substantially around the second drive wheel 106b.

For example, the power transmission mechanism 110 may have a first side 117 and a second side 118 opposite the first side 117. The first side 117 of the power transmission mechanism 110 may wrap around the top portion 116 of the first drive wheel 106a so that the first portion of the power transmission mechanism 110a dangles from one side of the first drive wheel 106a away from the second drive wheel 106b. The intermediate portion of the power transmission mechanism 110c (i.e. the portion in between the first portion of the power transmission mechanism 110a and the second portion of the power transmission mechanism 110b) then descends towards the bottom 119 of the second drive wheel 106b and the second side 118 of the power transmission mechanism 110 wraps around the second drive wheel 106b until it loops around the second drive wheel 106b and descends in between the first drive wheel 106a and the second drive wheel 106b so that the second portion of the power transmission mechanism 110b is parallel to the first portion of the power transmission mechanism 110a.

In the example shown in FIG. 3B, when the first portion of the power transmission mechanism 110a moves in the first linear direction (e.g. downwardly), the first drive wheel 106a rotates in the first rotational direction. Due to the orientation of the first one-way bearing 108a, the first drive wheel 106a engages the first one-way bearing 108a, which causes the first output shaft 104a to rotate in the first rotational direction (e.g. counterclockwise). In the meanwhile, due to the configuration of the first power transmission mechanism 110 as described above, the second drive wheel 106b rotates in a second rotational direction (clockwise) opposite the first rotational direction. The second one-way bearing 108b in the second drive wheel 106b, however, is oriented so that the second drive wheel 106b freewheels in the second rotational direction, and therefore, the second output shaft 104b does not rotate with the second drive wheel 106b in the second rotational direction.

As shown in FIG. 3C, when the second portion of the first power transmission mechanism 110b moves in the first linear direction (e.g. downwardly), the second drive wheel 106b rotates in the first rotational direction (e.g. counterclockwise). Due to the orientation of the second one-way bearing 108b, the second drive wheel 106b engages the second output shaft 104b, and the second output shaft 104b rotates in the first rotational direction (e.g. counterclockwise). In the meanwhile, due to the arrangement of the power transmission mechanism 110, downward movement of the second portion of the power transmission mechanism 110b causes the first drive wheel 106a to rotate in the second rotational direction. Due to the first one-way bearing 108a of the first drive wheel 106a, the first drive wheel 106a is allowed to freewheel in the second rotational direction, and the first output shaft 104a does not rotate with the first drive wheel 106a in this direction. Therefore, if a load 10 is operatively attached to the first output shaft 104a and the second output shaft 104b, then movement of the first portion of the power transmission mechanism 110a in the first linear direction and movement of the second portion of the power transmission mechanism 110b in the first linear direction will each impart work on the load 10. Therefore, if the device 100 is arranged vertically as shown, then whether the user is pressing down on the first portion of the power transmission mechanism 110a or on the second portion of the power transmission mechanism 110b, the load 10 will receive constant power. In some embodiments, each output shaft 104a, 104b can have its own load in which case the loads will only receive power when their respective portion of the power transmission mechanism is moving in the first linear direction. Lever connectors 114a, 114b can be attached to the first and second portions of the power transmission mechanism 110a, 110b to which lever arms 112a, 112b can be attached, respectively, to facilitate movement of the first and second portions of the power transmission mechanism 110a, 110b.

If the user wants one of the output shafts 104a, 104b to move in opposite directions, the direction of one of the one-way bearings 108a or 108b can be reversed. In such a configuration, downward movement of one of the portions of the power transmission mechanism (e.g. 110a) will cause both output shafts 104a, 104b to rotate in opposite directions, while downward movement of the other portion of the power transmission mechanism (e.g. 110b) allows the drive wheels 106a, 106b to freewheel and reset the positioning of the first portion of the power transmission mechanism (e.g. 110a).

In some embodiments, rotation of the second drive wheel 106b may be operatively connected to the rotation of the first output shaft 104a and rotation of the first drive wheel 106a may be operatively connected to the rotation of the second output shaft 104b, so that movement of either the first portion of the power transmission mechanism 110a or the second portion of the power transmission mechanism 110b in the first linear direction causes rotation of the first output shaft 104a in the same rotational direction. Similarly, downward movement of either portions of the power transmission mechanism 110a, 110b can cause the second output shaft 104b to rotate in the same rotational direction.

For example, as shown in FIGS. 3A-3C, the linear powered input device 100 may further comprise a first output wheel 120a mounted on the first output shaft 104a to rotate with the first output shaft 104a; a second output wheel 120b mounted on the second output shaft 104b to rotate with the second output shaft 104b; and a transmission link 122 operatively connecting the first output wheel 120a to the second output wheel 120b. The transmission link 122 may be any mechanism that causes one output wheel 120a to act upon another output wheel 120b. In other words, the transmission link 122 causes movement of one output wheel 120a to impart movement in another output wheel 120b. For example, the transmission link 122 may be an elongated flexible-type material, such as a belt, a chain, a band, and the like; or a rigid rotating mechanism, such as a gear, a sprocket, and the like.

In this configuration, rotation of the first drive wheel 106a (e.g. by pulling downwardly on the first portion of the power transmission mechanism 110a) causes rotation of the first output shaft 104a in the first rotational direction, which in turn causes rotation of the first output wheel 120a in the first rotational direction. Since the first output wheel 120a is operatively connected to the second output wheel 120b by the transmission link 122, rotation of the first output wheel 120a causes rotation in the second output wheel 120b. In the example shown in FIGS. 3A-3C, the transmission link is an elongated flexible material-type; therefore, rotation of the first output wheel 120a in the first rotational direction causes rotation of the second output wheel 120b in the first rotational direction. Since the output wheels 120a, 120b are attached to their respective output shafts 104a, 104b to rotate with their respective output shafts 104a, 104b, rotation of the second output wheel 120b in the first rotational direction causes rotation of the second output shaft 104b in the first rotational direction as shown in FIG. 3B. Although downward movement of the first portion of the power transmission mechanism 110a causes rotation of the second drive wheel 106b in the second rotational direction, due to the orientation of the second one-way bearing 108b, rotation of the second drive wheel 106b in the second rotational direction does not interfere with the rotation of the second output shaft 104b in the first rotational direction.

Similarly, as shown in FIG. 3C, rotation of the second drive wheel 106b (e.g. by pulling downwardly on the second portion of the power transmission mechanism 110b) in the first rotational direction causes rotation of the second output shaft 104b in the first rotational direction, which in turn causes rotation of the second output wheel 120b in the first rotational direction. Since the second output wheel 120b is operatively connected to the first output wheel 120a by the flexible-type transmission link 122 (e.g. a chain), rotation of the second output wheel 120b in the first rotational direction causes rotation of the first output wheel 120a in the first rotational direction. Gears and other types of transmission links 122 can be used to create the same effect as will be shown in later embodiments. Rotation of the first output wheel 120a in the first rotational direction causes rotation of the first output shaft 104a in the first rotational direction. Although downward movement of the second portion of the power transmission mechanism 110b causes the first drive wheel 106a to rotate in the second rotational direction, due to the orientation of the first one-way bearing 108a, the first drive wheel 106a is allowed to freewheel in this direction, and therefore does not interfere with the rotation of the first output shaft 104a in the first rotational direction. Therefore, in this configuration, downward movement of either of the portions of the power transmission mechanism 110a, 110b causes both output shafts 104a, 104b to rotate in the same direction (in this example, counterclockwise). As such, the user is allowed to generate continuous output at both output shafts 104a, 104b by alternatingly pulling down on the first and second portions of the power transmission mechanism 110a, 110b. In other words, regardless of which portion of the power transmission mechanism 110a, 110b is being forced in the first direction, both output shafts 104a, 104b continuously receive power input. Lever connectors 114a, 114b can be attached to the first and second portions of the power transmission mechanism 110a, 110b to which lever arms 112a, 112b can be attached, respectively, to facilitate movement of the first and second portions of the power transmission mechanism 110a, 110b.

Figure 4A:
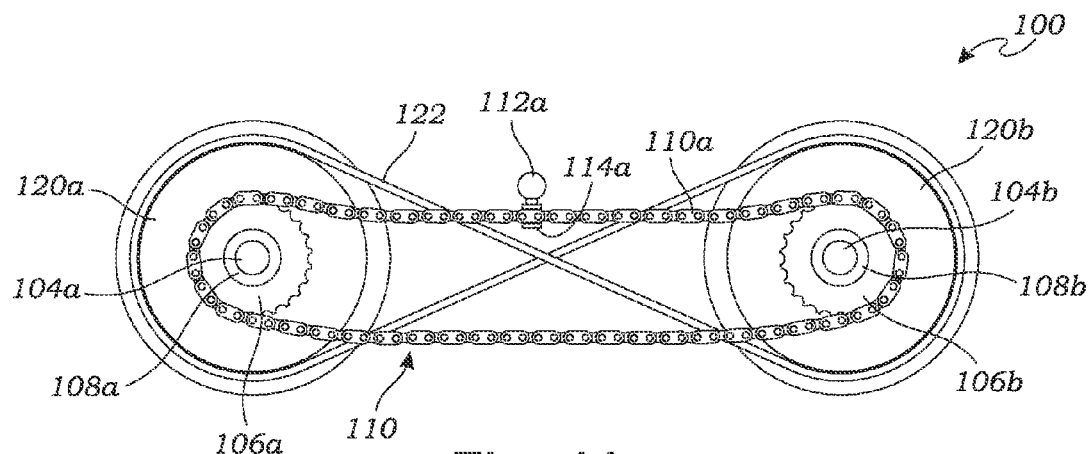
FIGS. 4A-4C show elevation views of another embodiment of the present invention.
Figure 4B:
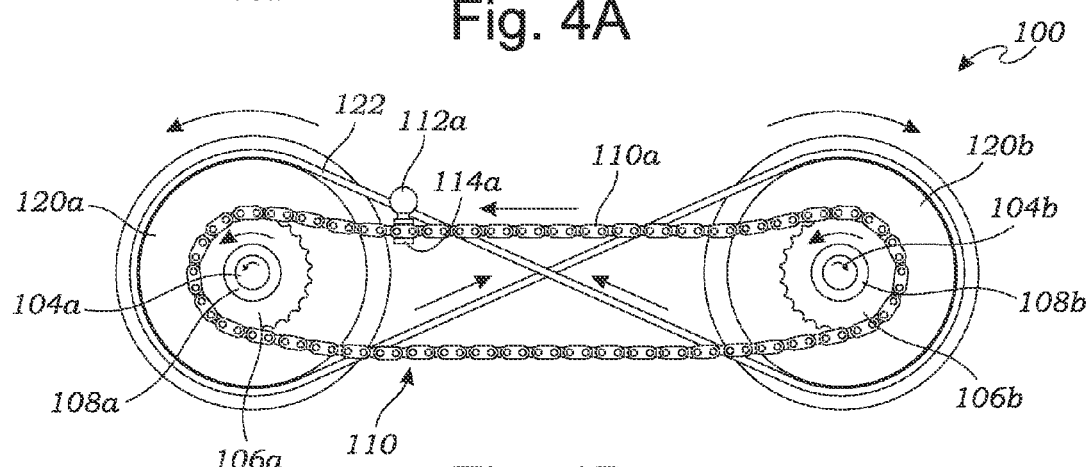
Figure 4C:
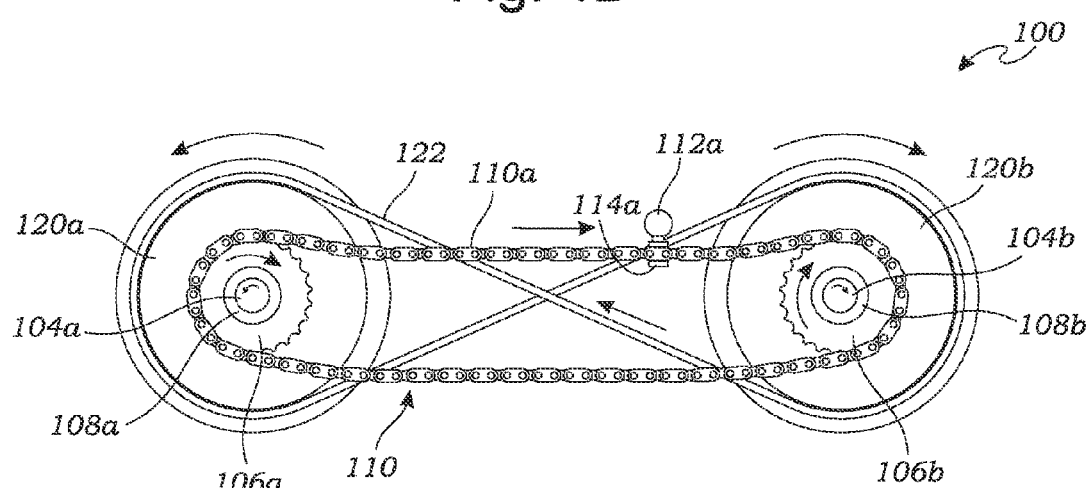

FIGS. 4A-4C show another embodiment of the present invention in which linear movement of a first portion of the transmission mechanism 110a in either direction causes at least one output shaft 104a to rotate in the same rotational direction. The linear powered input device 100 comprises a first drive wheel 106a having a first one-way bearing 108a, the first drive wheel 106a defining a first diameter and rotatable in a first plane of rotation, the first drive wheel mounted on a first output shaft 104a operatively connected to a first output wheel 120a; and a second drive wheel 106b having a second one-way bearing 108b, the second drive wheel 106b defining a second diameter and rotatable in the first plane of rotation, the second drive wheel 106b mounted on a second output shaft 104b operatively connected to a second output wheel 120b. The frame 102 is not shown for clarity. A power transmission mechanism 110 may be operatively connected to the first drive wheel 106a and the second drive wheel 106b such that when the first portion of the first power transmission mechanism 110a moves in the first linear direction (e.g. to the left as shown in FIG. 4B), the first drive wheel 106a and the second drive wheel rotate in the first rotational direction, and when the first portion of the power transmission mechanism 110a moves in the second linear direction (e.g. to the right as shown in FIG. 4C), the first drive wheel 106a and the second drive wheel 106b rotate in the second rotational direction. Due to the configuration of the one-way bearings 108a, 108b and the output wheels 120a, 120b, the first output shaft 104a always rotates in the same direction (e.g. counterclockwise), and the second output shaft always rotates in the second direction (e.g. clockwise). A lever connector 114a can be attached to the first portion of the power transmission mechanism 110a to which a lever arm 112a can be attached to facilitate movement of the first portion of the power transmission mechanism 110a.

For example, the first output wheel 120a may be mounted on the first output shaft 104a to rotate with the first output shaft 104a. The first drive wheel 106a may be mounted on the first output shaft 104a with a one-way bearing 108a such that rotation of the first drive wheel 106a in the first rotational direction causes the first output shaft 104a to rotate in the first rotational direction, but rotation of the first drive wheel 106a in the second rotational direction opposite the first rotational direction results in the first drive wheel 106a freewheeling due to the orientation of the first one-way bearing 108a, thereby not causing the first output shaft 104a to rotate in the second rotational direction.

Similarly, the second output wheel 120b may be mounted on the second output shaft 104b to rotate with the second output shaft 104b. The second drive wheel 106b may be mounted on the second output shaft 104b with a second one-way bearing 108b such that rotation of the second drive wheel 106b in the second rotational direction causes the second output shaft 104b to rotate in the second rotational direction, but rotation of the second drive wheel 106b in the first rotational direction results in the second drive wheel 106b to freewheeling due to the orientation of the second one-way bearing 108b, and not cause the second output shaft 104b to rotate in the first rotational direction.

A transmission link 122 operatively connects the first output wheel 120a to the second output wheel 120b so that the first output wheel 120a and the second output wheel 120b simultaneously rotate in opposite rotational directions. In this example, the transmission link 122 is a twisted belt, but other types of transmission links 122 can be used, such as gears. Therefore, as shown in FIG. 4B, rotation of the first drive wheel 106a in the first rotational direction caused by the linear movement of the first portion of the power transmission mechanism 110a in a first direction (e.g. to the left) causes rotation of the first output shaft 104a and the first output wheel 120a in the first rotational direction. Rotation of the first output wheel 120*a* in the first direction causes rotation of the second output wheel 120*b* in the second rotational direction. Since the second output wheel 120*b* rotates with the second output shaft 104*b*, the second output shaft 104*b* also rotates in the second rotational direction. Simultaneously, movement of the first portion of the power transmission mechanism 110*a* in the first direction causes rotation of the second drive wheel 106*b* in the first rotational direction. However, since the second drive wheel 106*b* freewheels in the first rotational direction, the second output shaft 104*b* is allowed to rotate in the second rotational direction.

Similarly, as shown in FIG. 4C, rotation of the second drive wheel 106*b* in the second rotational direction, caused by movement of the first portion of the power transmission mechanism 110*a* in a second linear direction opposite the first linear direction (e.g. to the right), causes rotation of the second output shaft 104*b* in the second rotational direction due to the orientation of the second one-way bearing 108*b*. Rotation of the second output shaft 104*b* in the second rotational direction causes the second output wheel 120*b* to rotate in the second rotational direction. Due to the arrangement of the transmission link 122, rotation of the second output wheel 120*b* in the second rotational direction causes rotation of the first output wheel 120*a* in the first rotational direction. Since the first output wheel 120*a* rotates with the first output shaft 104*a*, rotation of the first output wheel 120*a* in the first rotational direction causes rotation of the first output shaft 104*a* in the first rotational direction. In addition, movement of the first portion of the power transmission mechanism 110*a* in the second linear direction causes rotation of the first drive wheel 106*a* in the second rotational direction. Since the first drive wheel 106*a* freewheels in the second rotational direction, the first output shaft 104*a* is still allowed to rotate in the first rotational direction. Therefore, regardless of which linear direction the first portion of the power transmission mechanism 110*a* is moving, the first output shaft 104*a* always rotates in the first rotational direction, and the second output shaft 104*b* always rotates in the second rotational direction.

This can be accomplished when the transmission link 122 is operatively connected to the first output wheel 120*a* and the second output wheel 120*b* in a FIG. 8 configuration, such that rotation of the second output wheel 120*b* in the second rotational direction causes the first output wheel 120*a* to rotate in the first rotational direction, and vice versa. In other words, rotation of the first output wheel 120*a* in one rotational direction causes the second output wheel 120*b* to rotate in the opposite rotational direction. This can also be accomplished by connecting the first output wheel 120*a* and the second output wheel 120*b* with gears.

FIGS. 5A-5D show another embodiment of the linear powered input device 100 in which gears are used as the transmission link 122. Like each of the embodiments, the linear powered input device 100 comprises a first drive wheel 106*a* having a first one-way bearing 108*a* mounted on a first output shaft 104*a*, the first output shaft 104*a* mounted on a frame 102. The first drive wheel 106*a* has a first diameter and rotates within a first plane of rotation. This embodiment further comprises a second drive wheel 106*b* having a second one-way bearing 108*b* mounted on a second output shaft 104*b*, the second output shaft 104*b* mounted on the frame 102. The second drive wheel 106*b* has a second diameter and is rotatable in the first plane of rotation. The second output shaft 104*b* may be parallel to and set apart from the first output shaft 104*a*. The power transmission mechanism 110 is operatively connected to the first drive wheel 106*a* and the second drive wheel 106*b* such that when a first portion of the power transmission mechanism 110*a* moves in the first linear direction (e.g. downwardly), the first drive wheel 106*a* and the first output shaft 104*a* rotate in the first rotational direction (e.g. counterclockwise). Since the power transmission mechanism 110 is also connected to the second drive wheel 106*b*, the second drive wheel 106*b* also rotates in the first rotational direction. The second one-way bearing 108*b*, however, is oriented to allow the second drive wheel 106*b* to freewheel in the first rotational direction so that the second output shaft 104*b* does not rotate with the second drive wheel 106*b* in the second rotational direction.

Figure 5A:
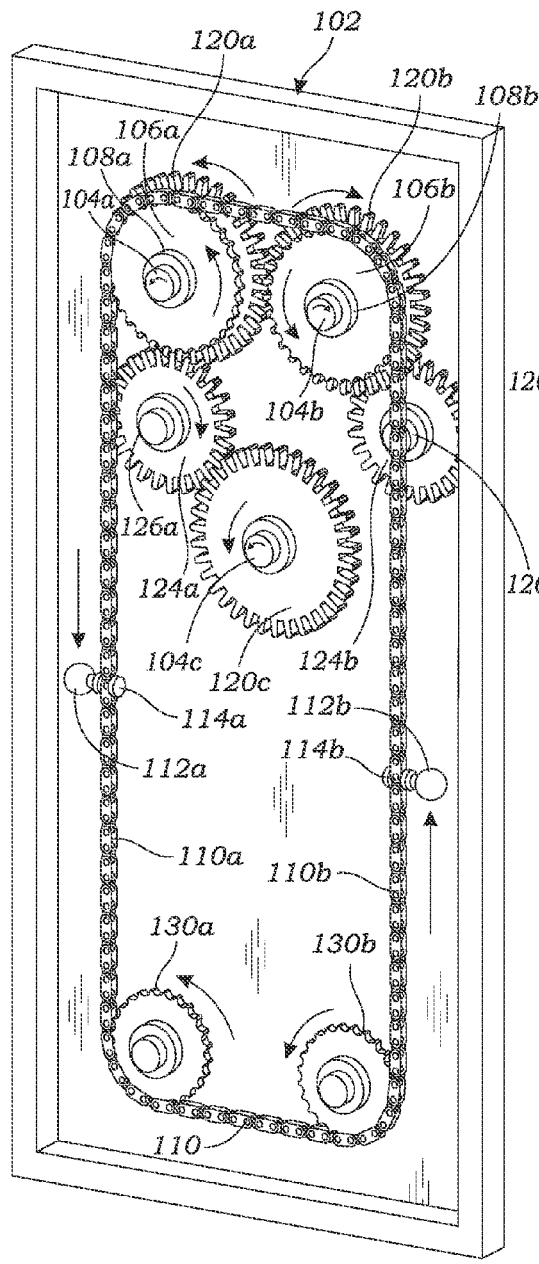
FIGS. 5A-5D show perspective views of another embodiment of the present invention.
Figure 5B:
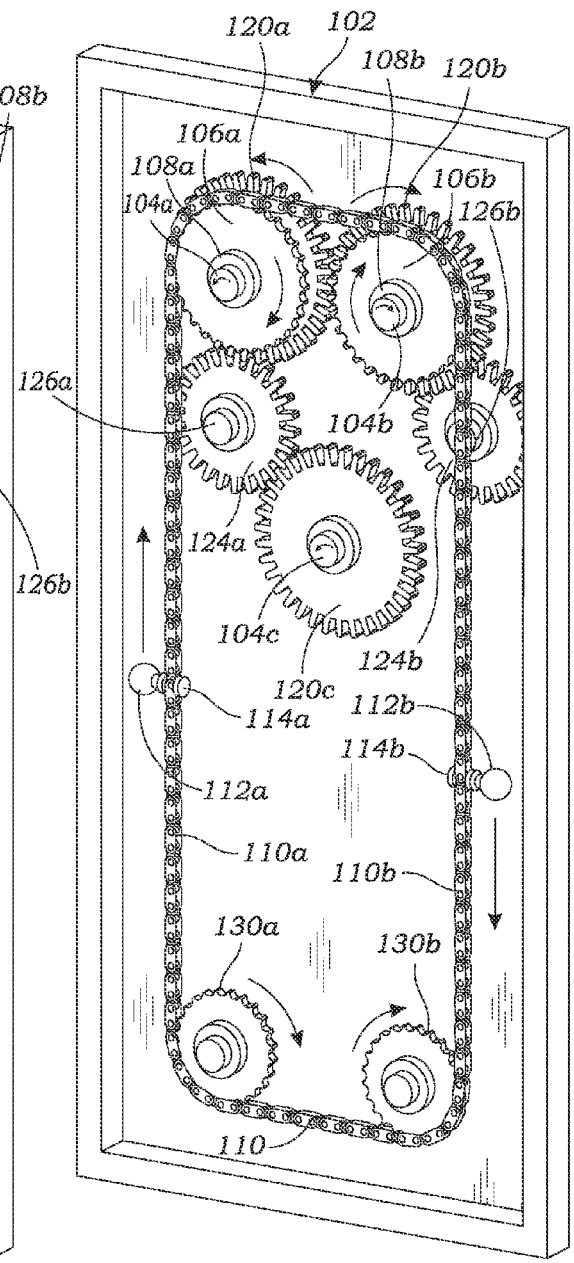

Conversely, as shown in FIG. 5B, when a second portion of the first power transmission mechanism 110*b*, opposite the first portion of the first power transmission mechanism 110*a*, moves in the first linear direction (e.g. downwardly), the second drive wheel 106*b* rotates in the second rotational direction. In this rotational direction, the second one-way bearing 108*b* engages the second output shaft 104*b* and the second output shaft 104*b* rotates in the second rotational direction. Since the power transmission mechanism 110 is still connected to the first drive wheel 106*a*, the first drive wheel 106*a* also rotates in the second rotational direction. However, due to the orientation of the first one-way bearing 108*a*, the first drive wheel 106*a* freewheels in this direction and does not engage the first output shaft 104*a*, so the first output shaft 104*a* does not rotate in the second rotational direction with the first drive wheel 106*a*.

With the use of toothed output wheels 120*a*, 120*b*, the second drive wheel 106*b* can be operatively connected to the first output shaft 104*a* to cause the first output shaft to rotate in the first rotational direction. Similarly, the first drive wheel 106*a* can be operatively connected to the second output shaft 104*b* to cause the second output shaft 104*b* to rotate in the second rotational direction. For example, the first output wheel 120*a* may be mounted on the first output shaft 104*a* to rotate with the first output shaft 104*a*. Similarly, a second output wheel 120*b* may be mounted on the second output shaft 104*b* to rotate with the second output shaft 104*b*. Furthermore, since the first output wheel 120*a* and the second output wheel 120*b* are toothed gears, the first output wheel 120*a* and the second output wheel 120*b* can be operatively connected to each other, directly, without the need of a chain, belt, band, or the like, such that rotation of the first output wheel 120*a* in the first rotational direction causes rotation of the second output wheel 120*b* in the second rotational direction, and rotation of the second output wheel 120*b* in the second rotational direction causes rotation of the first output wheel 120*a* in the first rotational direction. For example, the first and second output wheels 120*a*, 120*b* may be in the same plane. In some embodiments, if the first and second output wheels 120*a*, 120*b* need to be spaced apart for structural reasons, shift gears can be inserted between the first and second output wheels 120*a*, 120*b* to operatively connect the first and second output wheels 120*a*, 120*b* as will be discussed later.

Therefore, in the example shown in FIGS. 5A-5D, downward linear movement of the first portion of the power transmission mechanism 110*a* causes the first drive wheel 106*a* to rotate in the first rotational direction (e.g. counterclockwise). Due to the orientation of the first one-way bearing 108*a*, the first drive wheel 106*a* engages the first output shaft 104*a* and causes the first output shaft 104*a* to rotate in the first rotational direction. Since the first output wheel 120*a* rotates with the first output shaft 104*a*, the first output wheel 120*a* also rotates in the first rotational direction. Rotation of the first output wheel 120*a* causes the second output wheel 120b to rotate in the second rotational direction opposite the first rotational direction. Since the second output wheel 120b rotates with the second output shaft 104b, the second output shaft 104b rotates in the second rotational direction. Since the second drive wheel 106b is connected to the power transmission mechanism 110, the second drive wheel 106b also rotates in the first rotational direction. Due to the orientation of the second one-way bearing 108b, however, rotation of the second drive wheel 106b in the first rotational direction does not interfere with the rotation of the second output shaft 104b in the second rotational direction due to its freewheeling action in this direction.

Similarly, downward linear movement of the second portion of the power transmission mechanism 110b causes the second drive wheel 106b to rotate in the second rotational direction (e.g. clockwise). Due to the orientation of the second one-way bearing 108b, the second drive wheel 106b engages the second output shaft 104b and causes the second output shaft 104b to rotate in the second rotational direction. Since the second output wheel 120b rotates with the second output shaft 104b, the second output wheel 120b also rotates in the second rotational direction. Rotation of the second output wheel 120b causes the first output wheel 120a to rotate in the first rotational direction opposite the second rotational direction. Since the first output wheel 120a rotates with the first output shaft 104a, the first output shaft 104a rotates in the first rotational direction with the first output wheel 120a. Since the first drive wheel 106a is connected to the power transmission mechanism 110, the first drive wheel 106a also rotates in the second rotational direction. Due to the orientation of the first one-way bearing 108a, however, rotation of the first drive wheel 106a in the second rotational direction does not interfere with the rotation of the first output shaft 104a in the first rotational direction. Therefore, movement of either portion of the power transmission mechanism 110a, 110b in either linear direction always causes the first output shaft 104a to rotate in the first rotational direction and the second output shaft 104b to rotate in the second rotational direction.

In some embodiments, to lengthen the power transmission mechanism 110 so as to have a first portion of the power transmission mechanism 110a and a second portion of the power transmission mechanism 110b accessible on opposing sides so that both can undergo a linear motion, the linear powered input device 100 may further comprise a first and second idler wheel 130a, 130b aligned with and rotatable in the same plane of rotation as the first and second drive wheels 106a, 106b, respectively. This arrangement allows the first portion of the power transmission mechanism 110a to follow a first vertical path in between the first drive wheel 106a and the first idler wheel 130a, and the second portion of the power transmission mechanism 110b to follow a second vertical path in between the second drive wheel 106b and the second idler wheel 130b. In this example, since the power transmission mechanism 110 is a chain, the idler wheels 130a, 130b are sprockets and an infinite or continuous loop is created. Lever connectors 114a, 114b can be attached to the first and second portions of the power transmission mechanism 110a, 110b to which lever arms 112a, 112b can be attached, respectively, to facilitate movement of the first and second portions of the power transmission mechanism 110a, 110b.

With this foundational setup, multiple variations can arise for a variety of different practical implementations. For example, in some embodiments, the linear powered input device 100 may further comprise a third output shaft 104c rotatably attached to the frame 102; a third output wheel 120c mounted on the third output shaft 104c; and a first shift gear 124a mounted on a first axle 126a operatively connected to the frame 102, wherein the first shift gear 124a is configured to adopt an engaged configuration in which the first shift gear 124a is engaged with one of the first or second drive wheels 106a, 106b (e.g. via the output wheels 120a, 120b) and the third output wheel 120c, and a disengaged configuration in which the first shift gear 124a is disengaged from the each of the first and second drive wheels 106a, 106b and, optionally, disengaged from the third output wheel 120c. The third output wheel 120c may rotate within the plane of rotation of the first and second drive wheels 106a, 106b or, preferably, the plane of rotation of the first and second output wheels 120a, 120b. The first shift gear 124a can engage or disengage from the drive wheels 106a, 106b (or output wheels 120a, 120b) and the third output wheel 120c by shifting in and out of the plane of rotation in which the first and second drive wheels 106a, 106b and the third output wheel 120c rotate. In the preferred embodiment, the first shift gear 124a may directly engage and disengage from the first and second output wheels 120a, 120b.

In some embodiments, the first shift gear 124a can engage or disengage from the drive wheels 106a, 106b by shifting within the plane of rotation of the drive wheels 106a, 106b, or the first and second output wheels 120a, 120b, to a position in which the first shift gear 124a is or is not affected by any of the drive wheels 106a, 106b, first and second output wheels 120a, 120b, and/or the third output wheel 120c.

For example, as shown in FIGS. 5A-5B, the first shift gear 124a may be slidably mounted on the first axle 126a to slide along the first axle 126a into and out of the plane of rotation of the output wheels 120a, 120b. When the first shift gear 124a slides along the first axle 126a into the plane of rotation of the first output wheel 120a, the first shift gear 124a is in the engaged configuration with the first output wheel 120a and the third output wheel 120c as shown in FIG. 5A. When the first shift gear 124a is slid out of the plane of rotation of the first output wheel 120a, it is in the disengaged configuration as it would not contact the first output wheel 120a or the third output wheel 120c as shown in FIG. 5C.

In some embodiments, the linear powered input device 100 may utilize two shift gears. For example, a second shift gear 124b may be slidably mounted on a second axle 126b mounted on the frame 102 to slide in and out of the plane of rotation of the second output wheel 120b and the third output wheel 120c. The user can then toggle between the first and second shift gears 124a, 124b to determine which direction the third output wheel 120c, and therefore, the third output shaft 104c will rotate. For example, the first shift gear 124a may be slidably mounted on the first axle 126a to slide into the plane of rotation of the first output wheel 120a to engage the first output wheel 120a and the third output wheel 120c while the second shift gear 124b is slid out of the plane of rotation of the second output wheel 120b so as to be disengaged from the second output wheel 120b and the third output wheel 120c as shown in FIGS. 5A and 5B. This will cause the third output wheel 120c and the third output shaft 104c to rotate in the same direction as the first output wheel 120a.

Figures 5C, 5D:
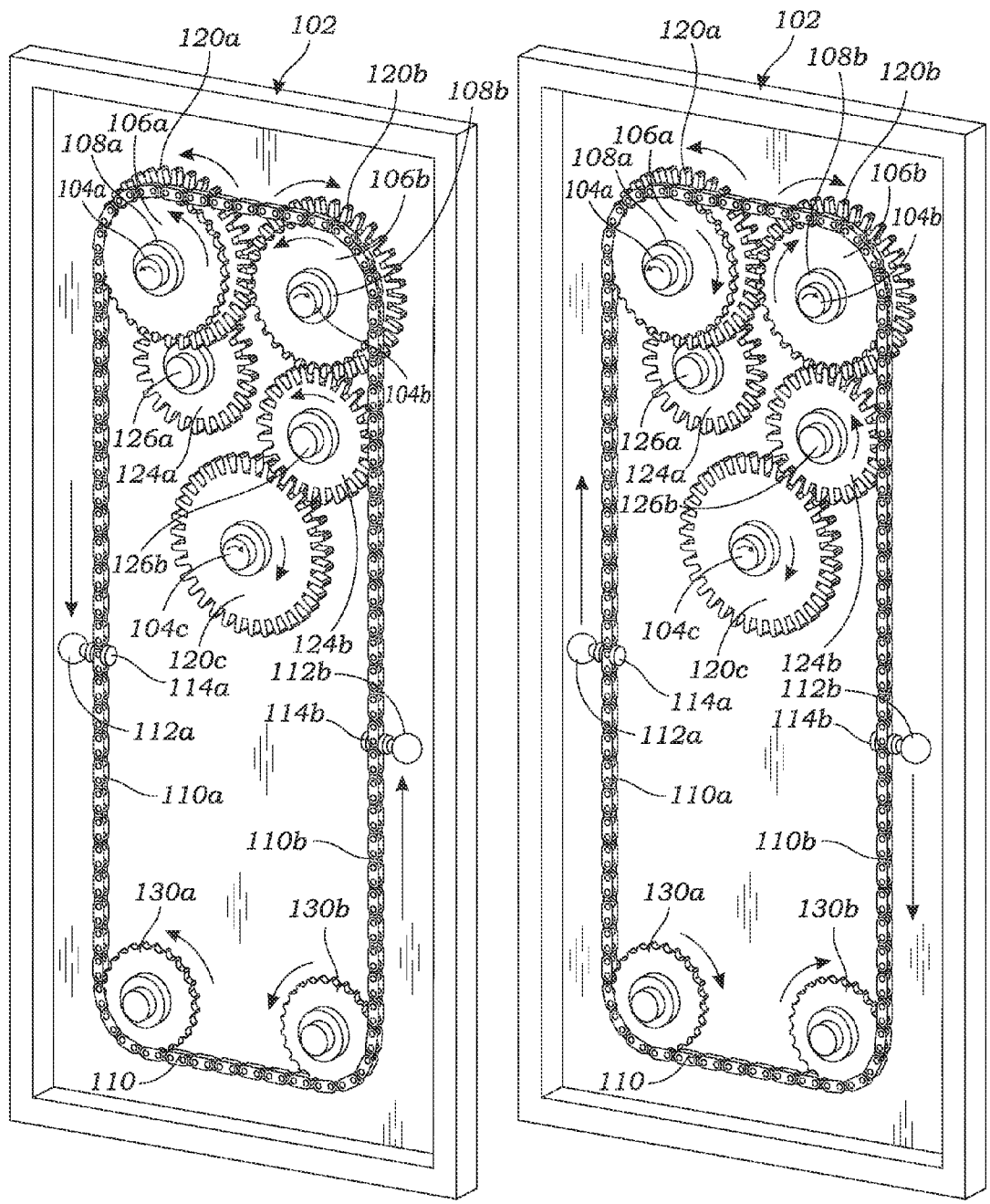

The first shift gear 124a can then be slid out of the plane of rotation of the first output wheel 120a to disengage from the first output wheel 120a and the third output wheel 120c, and the second shift gear 124b, which is slidably mounted on the second axle 126b, can be slid into the plane of rotation of the second output wheel 120b to engage the second output wheel 120b and the third output wheel 120c to cause the third output wheel 120c and the third output shaft 104c to rotate in the same direction as the second output wheel 120b as shown in FIGS. 5C and 5D. To disengage the second shift gear 124b from the second output wheel 120b, the second shift gear 124b may be slid out of the plane of rotation of the second output wheel 120b so that the second shift gear 124b can no longer affect the second output wheel 120b and the third output wheel 120c. Therefore, depending on which shift gear 124a, 124b the third output wheel 120c is connected to, the third output wheel 120c will constantly rotate in the first rotational direction or the second rotational direction whether the first portion of the power transmission mechanism 110a moves in the first and second linear direction.

The first shift gear 124a may be directly connectable to the first output wheel 120a and the third output wheel 120c, and the second shift gear 124b may be directly connectable to the second output wheel 120b and the third output wheel 120c, or the connections may be indirect through a series of gears.

Figure 6C:
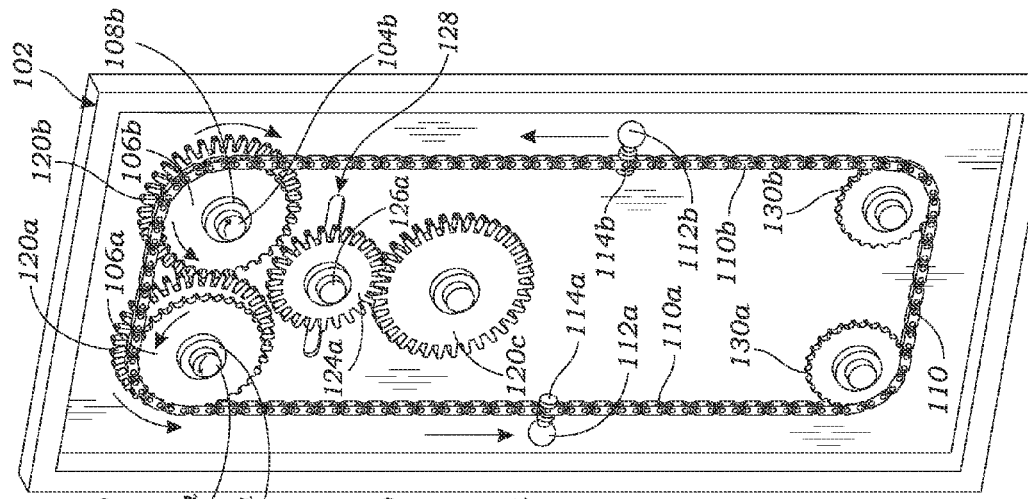
FIGS. 6A-6C show perspective views of another embodiment of the present invention.
Figure 6B:
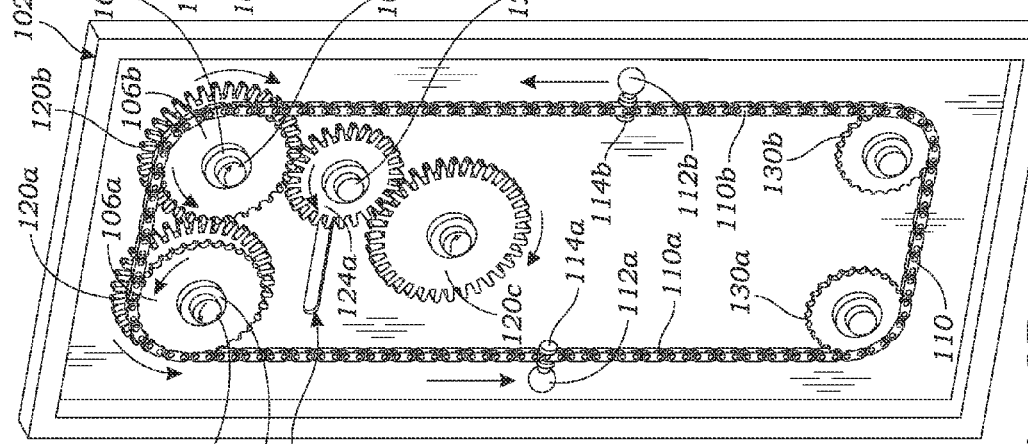
Figure 6A:
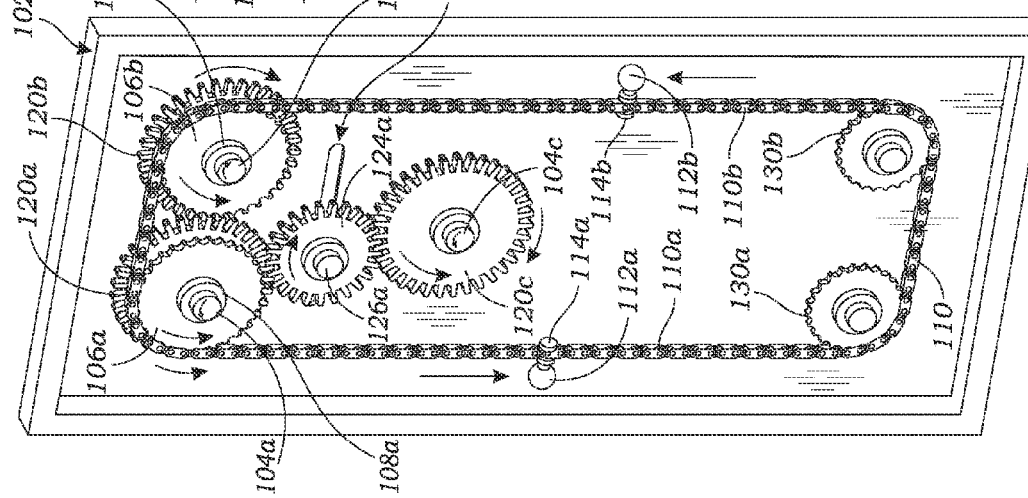

In another example, as shown in FIGS. 6A-6C the frame 102 may define a slot 128, wherein the first axle 126a is mounted in the slot 128 of the frame 102 and capable of sliding into a first engaged configuration in which the first shift gear 124a is engaged with the first output wheel 120a and the third output wheel 120c causing the third output wheel 120c to rotate in the same rotational direction as the first output wheel 120a as shown in FIG. 6A. The first axle 126a is capable of sliding within the slot 128 into a second engaged configuration in which the first shift gear 124a is engaged with the second output wheel 120b and the third output wheel 120c causing the third output wheel 120c to rotate in the same rotational direction as the second output wheel 120b as shown in FIG. 6B. The first axle 126a is also capable of sliding within the slot 128 into a disengaged configuration in which the first shift gear 124a is disengaged from the first and second output wheels 120a, 120b, for example by residing in between the first and second output wheels 120a, 120b as shown in FIG. 6C.

The types of application the linear powered input device 100 can be used for will determine the type of frame 102 required. In general, the frame 102 provides a foundation upon which the other components are attached.

Figure 7A:
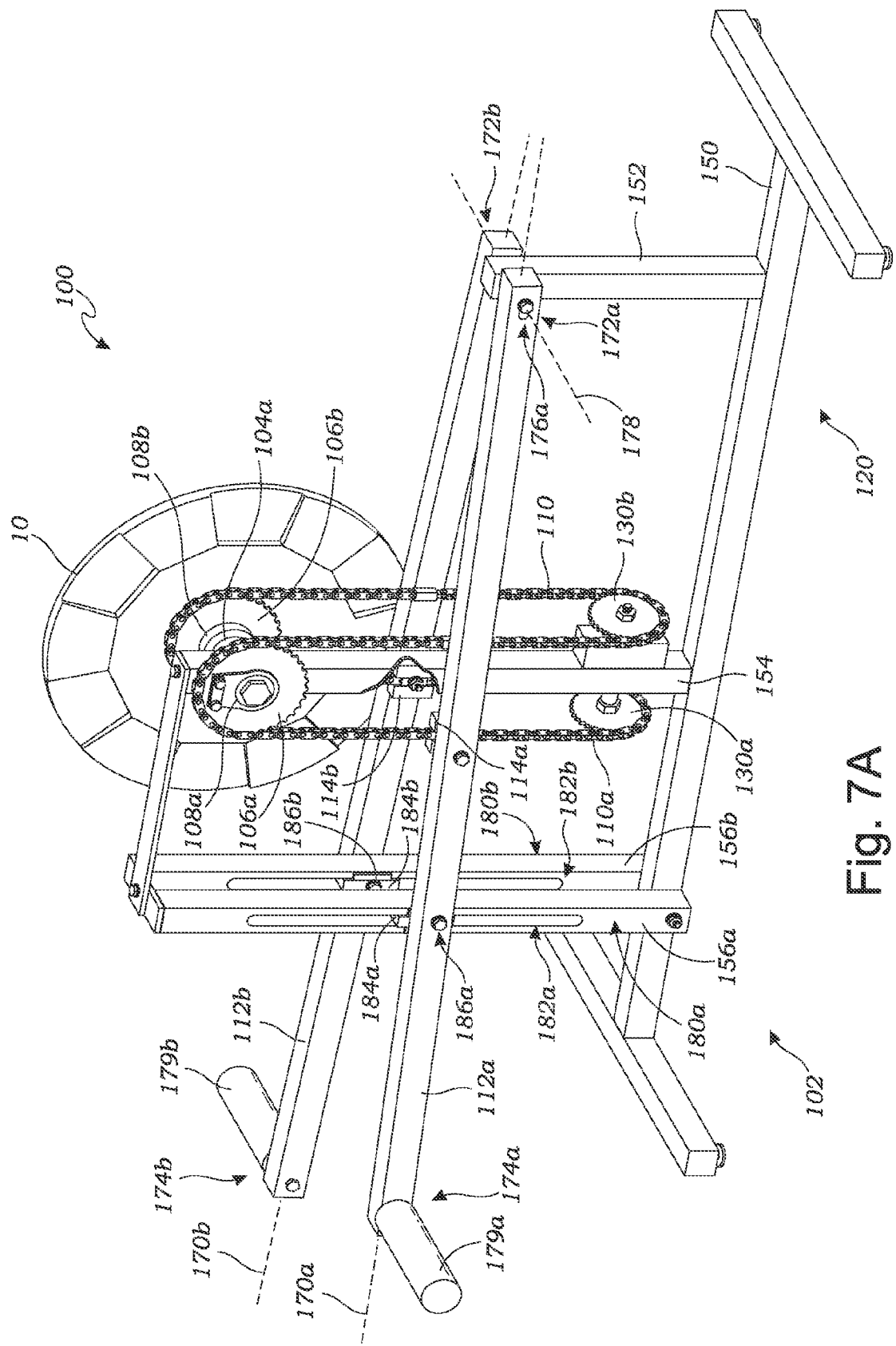
FIGS. 7A-7C show perspective views of another embodiment of the present invention.
Figure 7B:
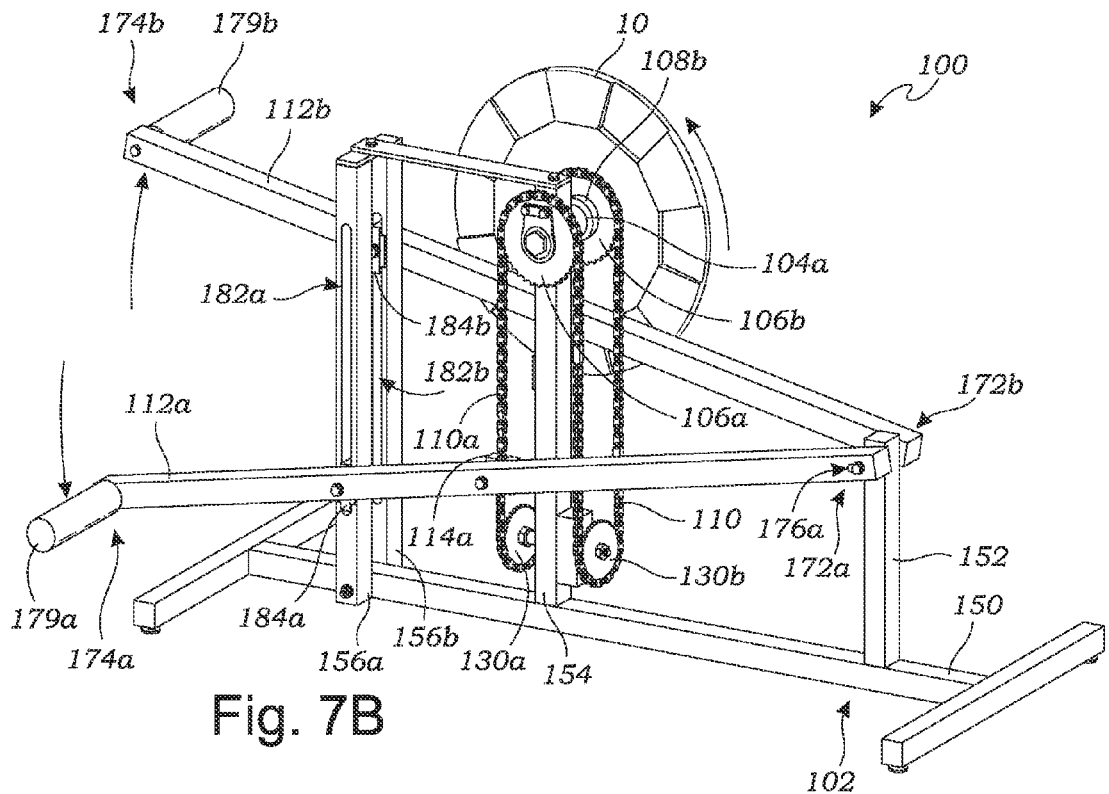
Figure 7C:
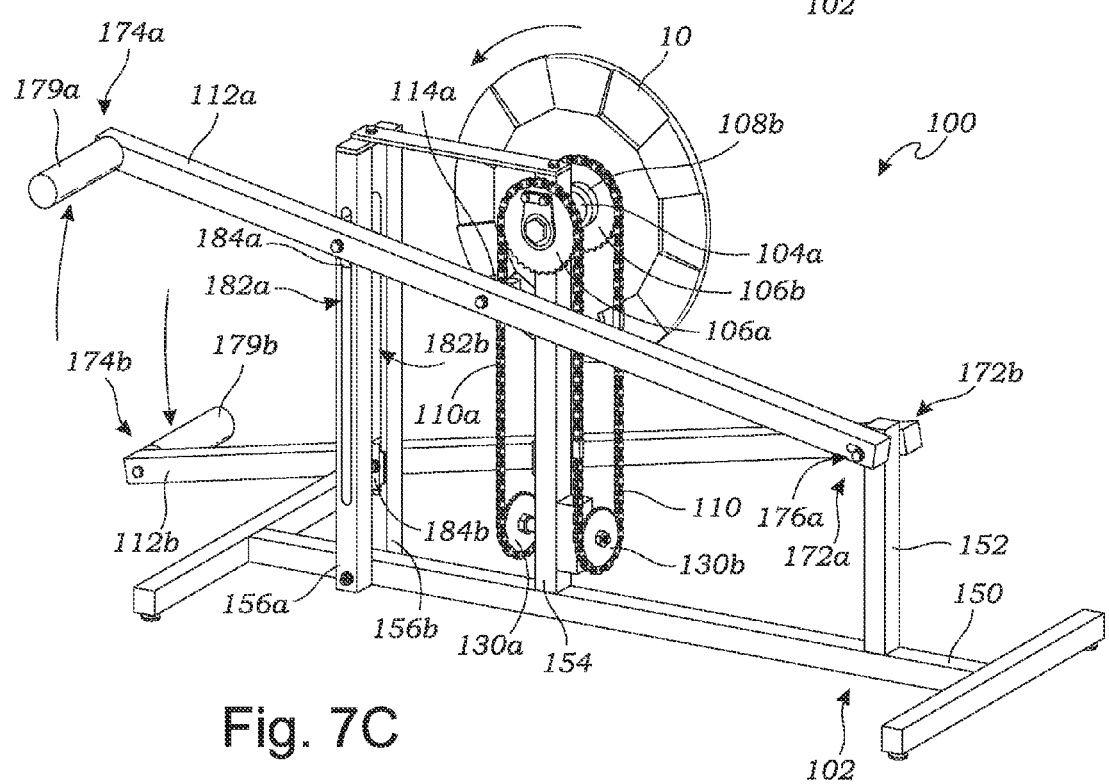

As shown in FIGS. 7A-7C, the concepts of the linear powered input device 100 can be implemented in a crank-type machine in which two lever arms 112a, 112b are used to drive the power transmission mechanism 110. This kind of device can be used in many different types of applications to drive a load 10, which can produce work or generate energy. In the embodiment shown, for exemplary purposes, the output shaft 104a drives a flywheel 10, which can be used as an exercise device.

The frame 102 may comprise a base 150 to elevate the various components of the present invention. The frame 102 may further comprise one or more posts 152, 154, 156. The output shaft 104a, the drive wheel 106a, the one-way bearing 108a, the power transmission mechanism 110, and the levers 112a, 112b, may all be attached to at least one of the posts 152, 154, 156. The first drive wheel 106a has a first diameter and rotates in a first plane of rotation.

In this embodiment, the linear powered input device 100, further comprises a second drive wheel 106b having a second one-way bearing 108b. The second drive wheel 106b defines a second plane of rotation parallel to and set apart from the first plane of rotation, and has a second diameter. The second drive wheel 106b may be arranged parallel to the first drive wheel 106a and mounted on the output shaft 104a. The power transmission mechanism 110 is operatively connected to the first and second drive wheels 106a, 106b such that when a first portion of the power transmission mechanism 110a moves in the first linear direction (e.g. forcing the first lever arm 112a downward), the first drive wheel 106a moves in the first rotational direction (e.g. counterclockwise). Due to the orientation of the first one-way bearing 108a, the first drive wheel 106a engages the first output shaft 104a causing the first output shaft 104a to rotate in the first rotational direction. Since the first output shaft 104a is operatively connected to the flywheel 10, the flywheel 10 also rotates in the first rotational direction.

The power transmission mechanism 110 may also be connected to the second drive wheel 106b in a manner that causes the second drive wheel 106b to rotate in the second rotational direction (e.g. clockwise) opposite the first rotational direction, when the first portion of the first power transmission mechanism 110a is moved in the first linear direction. Due to the orientation of the second one-way bearing 108b, the second drive wheel 106b is allowed to freewheel and does not cause the first output shaft 104a to rotate with the second drive wheel 106b. Therefore, the first output shaft 104a continues to rotate in the first rotational direction.

When a second portion of the first power transmission mechanism 110b (located parallel and adjacent to the first portion of the first power transmission mechanism 110a) moves in the first linear direction (e.g. forcing the second lever arm 112b downward), the second drive wheel 106b moves in the first rotational direction. Due to the orientation of the second one-way bearing 108b, the second drive wheel 106b engages the first output shaft 104a causing the first output shaft 104a to rotate in the first rotational direction. The arrangement of the power transmission mechanism 110 about the first and second drive wheels 106a, 106b causes the first drive wheel 106a to rotate in the second rotational direction when the second portion of the power transmission mechanism 110b moves in the first linear direction and the second drive wheel 106b rotates in the first rotational direction. Due to the orientation of the first one-way bearing 108a, however, the first drive wheel 106a freewheels and does not engage the first output shaft 104a, thereby allowing the first output shaft 104a to, again, rotate in the first rotational direction. Therefore, regardless of which lever arm 112a, 112b is moving in the first linear direction, the first output shaft 104a always rotates in the first rotational direction.

In some embodiments, in order to achieve the functions described above, the linear powered input device 100 may comprise a first idler wheel 130a rotatably mounted on the frame 102. The first idler wheel 130a defines a third plane of rotation and has a third diameter. The third plane of rotation may be perpendicular to the first and second planes of rotation and the first idler wheel 130a may be positioned substantially in between the first and second planes of rotation. Preferably, the first idler wheel 130a is positioned below the two drive wheels 106a, 106b.

A second idler wheel 130b may be mounted on the frame 102. The second idler wheel 130b defines a fourth plane of rotation and has a fourth diameter. The fourth plane of rotation may be parallel to the third plane of rotation and perpendicular to the first and second planes of rotation. The second idler wheel 130b is positioned substantially in between the first and second planes of rotation. Preferably, the first idler wheel 130a and the second idler wheel 130b are spaced apart by a first distance substantially equivalent to the first and second diameters of the first and second drive wheels 106a, 106b. The first drive wheel 106a and the second drive wheel 106b are spaced apart by a second distance substantially equivalent to the third and fourth diameters of the first and second idler wheels 130a, 130b.

In the preferred embodiment, the power transmission mechanism 110 forms a continuous loop by wrapping around the top of the first drive wheel 106a, then descending down towards the first idler wheel 130a below the first drive wheel 106a while twisting 90 degrees (this segment is referred to as the first portion of the power transmission mechanism 110a). Due to the 90 degree twist, the power transmission mechanism 110 can then wrap under the first idler wheel 130a (which is oriented perpendicularly to the first drive wheel 106a) and ascend up towards the second drive wheel 106b while twisting 90 degrees, but in the reverse direction compared to the first 90 degree twist (this segment is referred to as the second portion of the power transmission mechanism 110b). Due to the second 90 degree twist, the power transmission mechanism 110 can then wrap over the top of the second drive wheel 106b (which was oriented perpendicularly to the first idler wheel 130a) and descend towards the second idler wheel 130b while twisting 90 degrees in the first direction (this segment is referred to as the third portion of the power transmission mechanism). Due to the third 90 degree twist, the power transmission mechanism 110 is able to wrap underneath the second idler wheel 130b (which is oriented perpendicularly to the second drive wheel 106b) and ascend back towards the first drive wheel 106a (this segment is referred to as the fourth portion of the power transmission mechanism) while twisting 90 degrees in the reverse direction to connect back at the top of the first drive wheel 106a, thereby creating a continuous loop. In the preferred embodiment, the drive wheels 106a, 106b and the idler wheels 130a, 130b are sprockets and the power transmission mechanism 110 is a chain.

A first lever arm 112a defined by a first elongated body defines a first longitudinal axis 170a and has a first pivoting end 172a and a first free end 174a opposite the first pivoting end 172a. The first pivoting end 172a comprises a first pivoting slot 176a and is pivotably connected to the frame 102 (for example, at post 152) at the first pivoting slot 176a, such that the first lever arm 112a can pivot about a pivoting axis 178 and can move bi-directionally along the first longitudinal axis 170a via the first pivoting slot 176a. The first free end 174a may comprise a first support 179a to improve the leverage at the first free end 174a.

A second lever arm 112b defined by a second elongated body defines a second longitudinal axis 170b and has a second pivoting end 172b and a second free end 174b opposite the second pivoting end 172b. The second pivoting end 172b comprises a second pivoting slot 176b and is pivotably connected to the frame 102 (for example, at post 152) at the second pivoting slot 176b such that the second lever arm 112b can pivot about the pivoting axis 178 and move bi-directionally along the second longitudinal axis 170b via the second pivoting slot 176b. The second free end 174b comprises a second support 179b. Since the first and second lever arms 112a, 112b are able to move in the direction of their respective longitudinal axes 170a, 170b during the pivoting action at their respective pivoting ends 172a, 172b, the free ends 174a, 174b can move along a linear pathway rather than the typical arcuate pathway that typical cranks arms traverse. Being able to move in a linear downward and upward pathways allows the user to maximize the amount of force applied to the levers since none of the force is being applied in a direction perpendicular to the upward and downward directions.

Preferably, the first drive wheel 106a, the second drive wheel 106b, the first idler wheel 130a, the second idler wheel 130b, and the first power transmission mechanism 110 are substantially in between the first lever arm 112a and the second lever 112b.

To further facilitate the linear directional movement of the first and second ends 174a, 174b of the lever arms 112a, 112b, one of the posts 156a may function as a linear guide rail. The linear guide rail has a first lateral side 180a defining a first guide slot 182a, and a second lateral side 180b opposite the first lateral side 180a, the second lateral slide 180b defining a second guide slot 182b. In some embodiments, the linear guide rail may be comprised of two posts 156a, 156b with the first guide slot 182a on the first post 156a, and the second guide slot 182b on the second post 156b.

A first sliding guide 184a may be slidably mounted in the first guide slot 182a, the first sliding guide 184a operatively connected to the first lever 112a at a first connection point 186a in between the first free end 174a and the first pivoting end 172a. A second sliding guide 184b may be slidably mounted in the second guide slot 182b, the second sliding guide 184b operatively connected to the second lever 112b at a second connection point 186b in between the second free end 174b and the second pivoting end 172b. Therefore, from the first connection point 186a to the first free end 174a, the first lever arm 112a cannot move in the horizontal direction. Rather any horizontal movement of the first lever arm 112a in the direction of the first longitudinal axis 170a occurs at the first pivoting end 172a due to the first pivoting slot 176a. Similarly, from the second connection point 186b to the second free end 174b, the second lever arm 112b cannot move in the horizontal direction. Rather any horizontal movement of the second lever arm 112b in the direction of the second longitudinal axis 170b occurs at the second pivoting end 172b due to the second pivoting slot 176b.

Furthermore, the first and second levers 112a, 112b may be fixed to the first power transmission mechanism 110 at lever connectors 114a, 114b, respectively, on opposite sides at appropriate locations along the first portion and the second portion of the first power transmission mechanism 110a, 110b, respectively, such that the first free end 174a and the second free end 174b move in a linear motion and in opposite directions. In other words, when the first free end 174a moves up, the second free end 174b moves down and vice versa as shown in FIGS. 7B and 7C.

In some embodiments, the sliding guide 184a may be connected at the lever connectors 114a for 100% three transfer, but can be attached to the lever arm 112a forward or in back of that point with little effect. The preferred version of the sliding guide 184a is a 1 inch square slotted steel pipe with a bolt attaching a square sized slide inside the square pipe to the lever. This eliminates any side to side motion and also ensures the 100% pure linear input.

When the linear powered input device 100 is used to perform work or generate energy, rather than exercise, it is desirable to ease the efforts of the user. The present invention eases the efforts of the user to impart force on a load by first converting all motion of the lever arms 112a, 112b at the free ends 174a, 174b (where the actual force by the user is applied) into an entirely linear motion to minimize wasted energy. Effort by the user can further be economized by changing the length of the lever arms 112a, 112b, adding gears, changing the size of the gears, tightening or loosening the power transmission mechanism, adding lever arms, and the like.

Figure 8A:
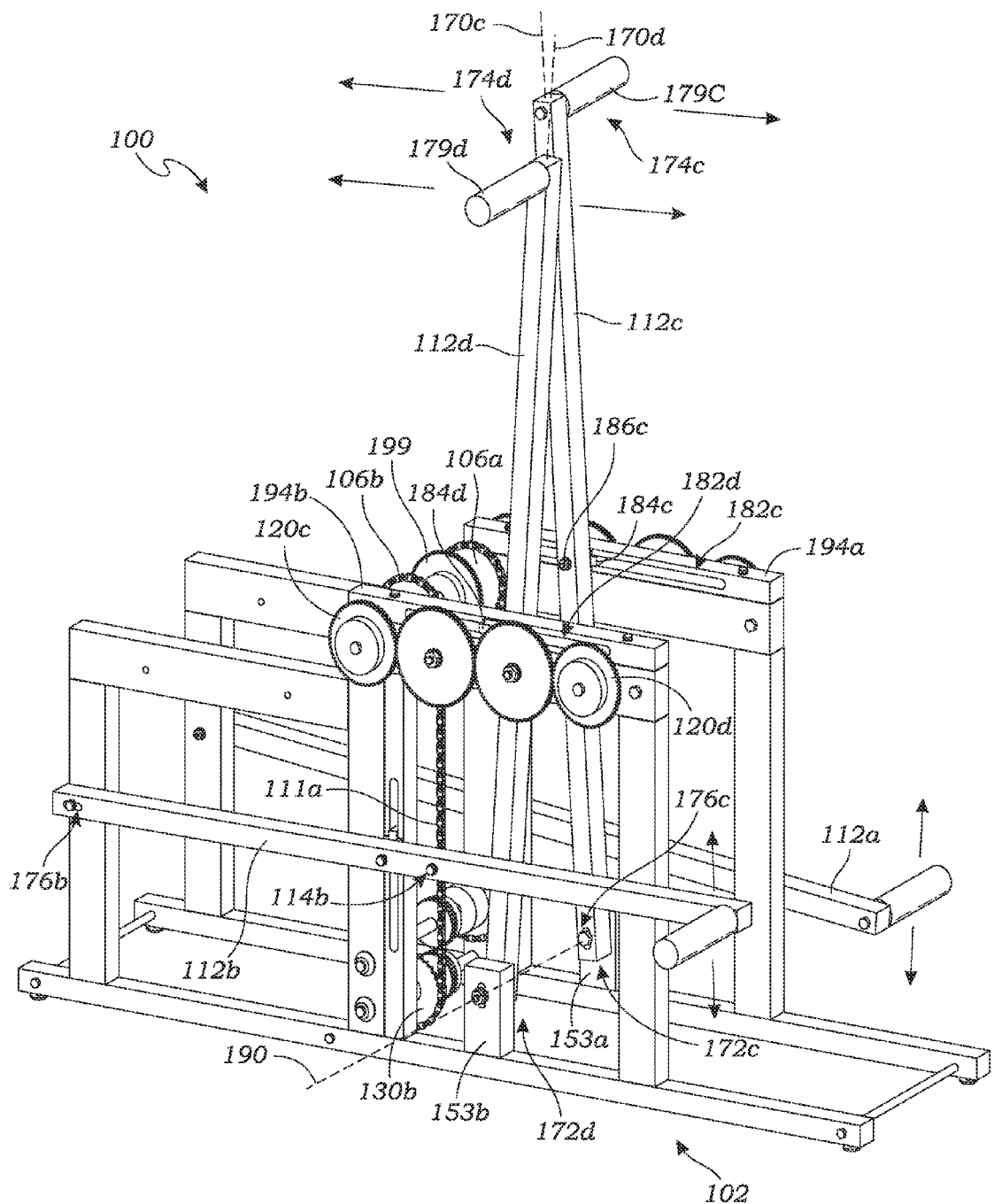
FIGS. 8A-8C show perspective views of another embodiment of the present invention.
Figure 8B:
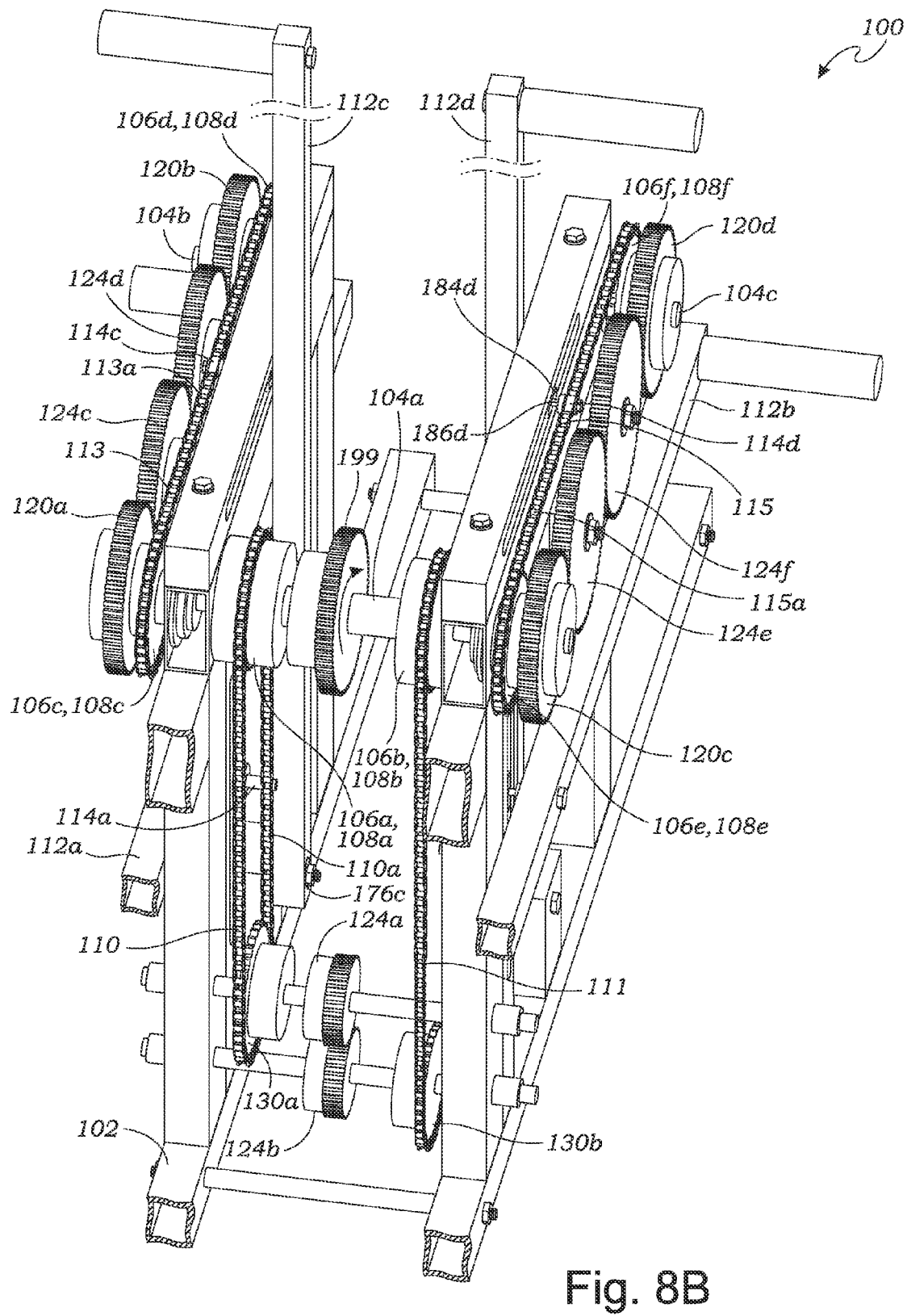
Figure 8C:
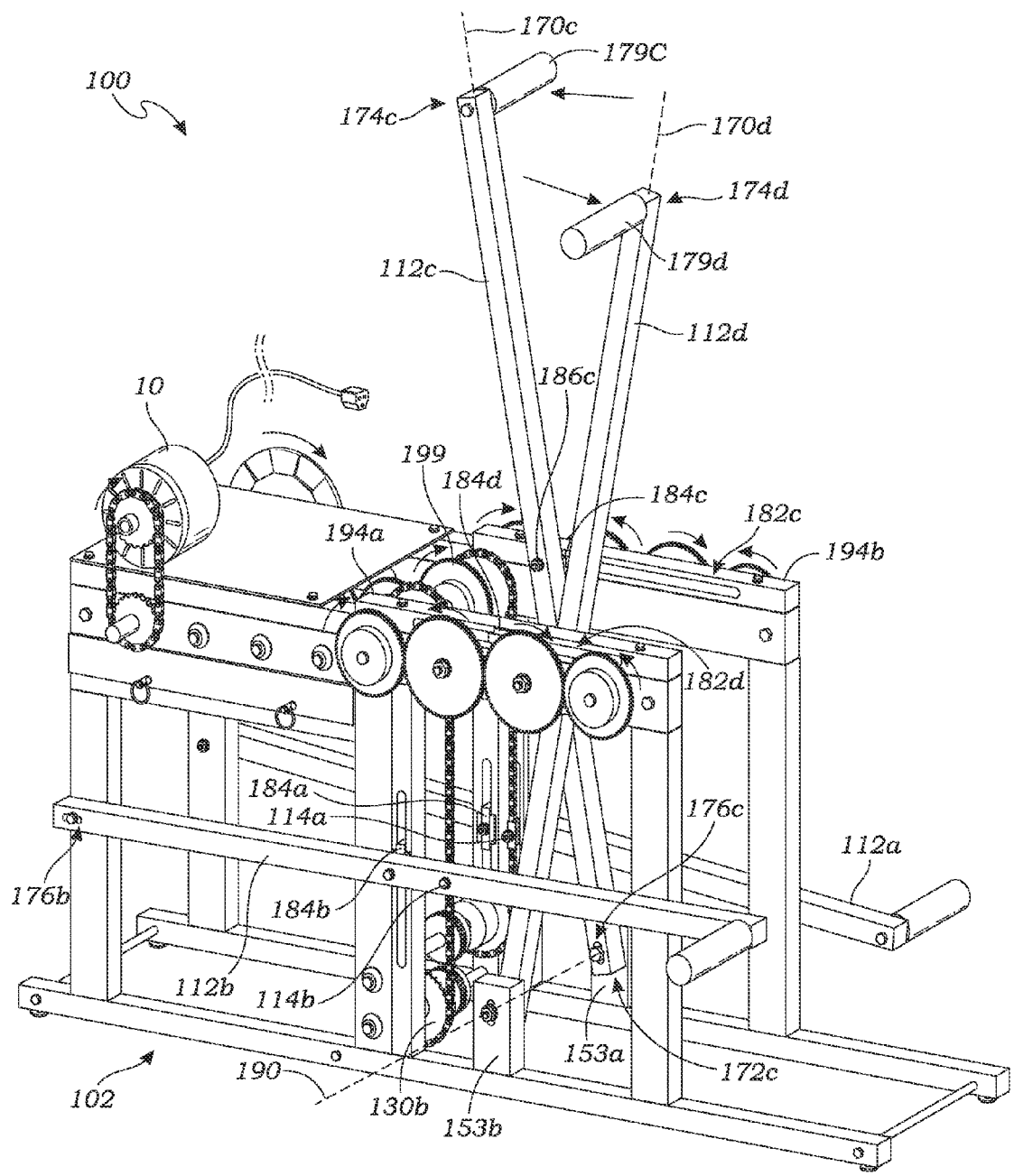

In some embodiments as shown in FIGS. 8A-8C, additional lever arms 112c, 112d can be added so that a single user can use both arms and both legs or any combination thereof to impart force on the output shaft 104a. By way of example only, in some embodiments, the linear powered input device 100 may comprise a first drive wheel 106a having a first one-way bearing 108a mounted on a first output shaft 104a mounted on a frame 102. The first drive wheel 106a defines a first plane of rotation. A first idler wheel 130a is located below the first drive wheel 106a, preferably within the first plane of rotation. A first power transmission mechanism 110 operatively connects the first drive wheel 106a to first idler wheel 130a such that the first drive wheel 106a and the first idler wheel 130a rotate in the same rotational direction. The first power transmission mechanism 110 may be operatively connected to the first lever arm 112a via a first lever connector 114a such that movement of the first lever arm 112a in a first linear direction (e.g. downward movement) causes movement of the first power transmission mechanism 110, which in turn causes the first drive wheel 106a, the first idler wheel 130a, and the output shaft 104a to rotate in a first rotational direction.

On the opposite side of the frame 102, the device 100 comprises a second drive wheel 106b having a second one-way bearing 108b, the second drive wheel 106b defining a second plane of rotation and having a second diameter, the second drive wheel 106b arranged parallel to and set apart from the first drive wheel 106a, and operatively connected to the output shaft 104a to rotate the output shaft 104a in the first rotational direction. A second idler wheel 130b is located below the second drive wheel 106b, and preferably within the second plane of rotation. A second power transmission mechanism 111 operatively connects the second drive wheel 106b to the second idler wheel 130b such that a first portion of the second power transmission mechanism 111a moving in the first linear direction (e.g. downward) causes the second drive wheel 106b, the second idler wheel 130b, and the output shaft 104a to rotate in the first rotational direction. A second lever arm 112b may be connected to the first portion of the power transmission mechanism 111a via a second lever connector 114b.

The first idler wheel 130a and the second idler wheel 130b may be operatively connected to each other by a first shift gear 124a and a second shift gear 124b such that rotation of the first idler wheel 130a in a first rotational direction causes rotation of the second idler wheel 130b in a second rotational direction opposite the first rotational direction; and rotation of the second idler wheel 130b in a first rotational direction causes rotation of the first idler wheel 130a in a second rotational direction opposite the first rotational direction. Since the idler wheels 130a, 130b are connected to each other and each idler wheel 130a, 130b is connected to its respective power transmission mechanisms 110, 111, movement of one power transmission mechanism 110 or 111 causes movement in the other power transmission mechanism 111 or 110. By way of example, if the first portion of the first power transmission mechanism 110a were to move in the first linear direction (e.g. downward), then the first portion of the second power transmission mechanism 111a would move in the second linear direction (e.g. upward), and vice versa.

Due to the orientations of the one-way bearings 108a, 108b, however, the output shaft 104a continues to rotate in the same rotational direction regardless of which direction the lever arms 112a, 112b are moving. For example, when the first portion of the first power transmission mechanism 110a moves in the first linear direction, the first drive wheel 106a rotates in the first rotational direction, which engages the first one-way bearing 108a, which in turn rotates the output shaft 104a in the first rotational direction. Simultaneously, the first power transmission mechanism 110 rotates the first idler wheel 130a in the first rotational direction, which causes the second idler wheel 130b to rotate in the second rotational direction. Rotation of the second idler wheel 130b in the second rotational direction causes the first portion of the second power transmission mechanism 111a to move in the second linear direction (e.g. upward), which causes the second drive wheel 106b to rotate in the second rotational direction. This does not cause the output shaft 104a to rotate in the second rotational direction due to the second one-way bearing 108b, which allows the second drive wheel 106b to freewheel in the second rotational direction.

Similarly, when the first portion of the second power transmission mechanism 111a moves in the first linear direction, the second drive wheel 106b rotates in the first rotational direction, which engages the second one-way bearing 108b, which in turn rotates the output shaft 104a in the first rotational direction. Simultaneously, the second power transmission mechanism 111 rotates the second idler wheel 130b in the first rotational direction, which causes the first idler wheel 130a to rotate in the second rotational direction. Rotation of the first idler wheel 130a in the second rotational direction causes the first portion of the first power transmission mechanism 110a to move in the second linear direction (e.g. upward), which causes the first drive wheel 106a to rotate in the second rotational direction. This does not cause the output shaft 104a to move in the second rotational direction due to the first one-way bearing 108a, which allows the first drive wheel 106a to freewheel in the second rotational direction.

In order to incorporate other limbs for use with the linear powered input device 100, the linear powered input device 100 may further comprise a third drive wheel 106c having a third one-way bearing 108c, the third drive wheel 106c operatively connected to the output shaft 104a; a third power transmission mechanism 113 operatively connected to the third drive wheel 106c, wherein the third power transmission mechanism 113 is oriented perpendicularly relative to the first power transmission mechanism 110, such that movement of a first portion of the third power transmission mechanism 113a in a third linear direction perpendicular to the first linear direction (e.g. horizontal) causes rotation of the output shaft 104a in the first rotational direction.

A fourth drive wheel 106d having a fourth one-way bearing 108d may be mounted on a second output shaft 104b so that bidirectional movement of the third power transmission mechanism 113 can cause the first output shaft 104a to rotate in the first rotational direction. For example, the third drive wheel 106c may be operatively connected to a first output wheel 120a and the fourth drive wheel 106d may be operatively connected to a second output wheel 120b. In the preferred embodiment, as shown best in FIG. 8B, the third drive wheel 106c and the fourth drive wheel 106d may be operatively connected by two additional shift gears 124c, 124d. Other types of transmission links as discussed in this application can be used, such as belts, chains, and bands. The third shift gear 124c may be directly connected to the first output wheel 120a and the fourth shift gear 124d. The fourth shift gear 124d may be directly connected to the second output wheel 120b and the third shift gear 124c. Therefore, the third and fourth shift gears 124c, 124d may be directly connected to each other in between the first and second output wheels 120a, 120b.

The fourth one-way bearing 108d may be oriented such that rotation of the fourth drive wheel 106d in the second rotational direction causes the second output shaft 104b to rotate in the second rotational direction and rotation of the fourth drive wheel 106d in the first rotational direction allows the fourth drive wheel 106d to freewheel and not rotate the second output shaft 104b in the first rotational direction.

In this configuration, when the first portion of the third power transmission mechanism 113a is moved in the fourth linear direction, the third drive wheel 106c freewheels and has no effect on the first output shaft 104a. Simultaneously, the fourth drive wheel 106d engages the second output shaft 104b and rotates the second output shaft 104b in the second rotational direction, which causes the second output wheel 120b to rotate in the second rotational direction. Since the second output wheel 120b is directly connected to the fourth shift gear 124d, the fourth shift gear 124d rotates in the first rotational direction. Since the fourth shift gear 124d is directly connected to the third shift gear 124c, the third shift gear 124c rotates in the second rotational direction. Since the third shift gear 124c is directly connected to the first output wheel 120a, the first output wheel 120a rotates in the first direction. Since the first output wheel 120a rotates with the first output shaft 104a, the first output shaft 104a rotates in the first rotational direction.

Conversely, when the first portion of the third power transmission mechanism 113a moves in the third linear direction, the third drive wheel 106c engages the first output shaft 104a and the third drive wheel 106c and the first output shaft 104a rotate in the first rotational direction. Rotation of the first output shaft 104a in the first rotational direction causes the first output wheel 120a to rotate in the first rotational direction. Since the first output wheel 120a is directly connected to the third shift gear 124c, the third shift gear 124c rotates in the second rotational direction. Since the third shift gear 124c is directly connected to the fourth shift gear 124d, the fourth shift gear 124d rotates in the first rotational direction. Since the fourth shift gear 124d is directly connected to the second output wheel 120b, the second output wheel 120b rotates in the second rotational direction. Since the second output wheel 120b rotates with the second output shaft 104b, the second output shaft 104b rotates in the second rotational direction. A load can be connected to the second output shaft 104b to perform work. Due to the third power transmission mechanism 113 moving in the third linear direction, the fourth drive wheel 106d freewheels in the first rotational direction and does not affect the rotation of the second output shaft 104b. Therefore, whether the first portion of the third power transmission 113a is moving in the third linear direction or the fourth linear direction, the first output shaft 104a always rotates in the same direction (e.g. the first rotational direction). Similarly, whether the first portion of the third power transmission mechanism 113a is moving in the third linear direction or the fourth linear direction, the second output shaft 104b always rotates in the same direction (e.g. the second rotational direction). Therefore, a third lever arm 112c can be attached to the first portion of the third power transmission mechanism 113a via a third level connector 114c to effectuate the bidirectional linear movement of the first portion of the third power transmission mechanism 113a. The distance of the linear movement can be modified by changing the size of the third and fourth shift gears 124c, 124d. Alternatively, additional shift gears can be inserted in between the first and second output wheels 120a, 120b. Preferably, the number of additional shift gears should be an even number so that the first output shaft 104a and the second output shall 104b rotate in opposite directions.

The configuration of the third drive wheel 106c and the fourth drive wheel 106d can be repeated with a fifth drive wheel 106e and a sixth drive wheel 106f on the opposite side of the frame 102. For example, the linear powered input device 100 may further comprise a fifth drive wheel 106e having a fifth one-way bearing 108e, the fifth drive wheel 106e operatively connected to the first output shaft 104a. A fourth power transmission mechanism 115 may be operatively connected to the fifth drive wheel 106e, wherein the fourth power transmission mechanism 115 is perpendicularly oriented relative to the first power transmission mechanism 110, such that movement of a first portion of the fourth power transmission mechanism 115a in the third linear direction causes rotation of the first output shaft 104a in the first rotational direction and movement of the first portion of the fourth power transmission mechanism 115a in the fourth linear direction allows the fifth drive wheel 106e to freewheel and not affect the rotation of the first output shaft 104a.

A sixth drive wheel 106f having a sixth one-way bearing 108f amounted on a third output shaft 104c may be provided in the same plane of rotation as the fifth drive wheel 106e. The sixth drive wheel 106f may be operatively connected to the fourth power transmission mechanism 115 such that movement of the first portion of the fourth power transmission mechanism 115a in the fourth linear direction opposite the third linear direction causes rotation of the first output shaft 104a in the first rotational direction.

For example, the sixth one-way bearing 108f may be oriented such that rotation of the sixth drive wheel 106f in the second rotational direction causes the third output shaft 104c to rotate in the second rotational direction and rotation of the sixth drive wheel 106f in the first rotational direction allows the sixth drive wheel 106f to freewheel and not rotate the third output shaft 104c in the first rotational direction.

The first output shaft 104a may be operatively connected to a third output wheel 120c so as to rotate together. The third output shaft 104c may be operatively connected to a fourth output wheel 120d so as to rotate together. The third and fourth output wheels 120c, 120d may be directly connected to each other, or indirectly connected to each other via fifth and sixth shift gears 124e, 124f.

In this configuration, when the first portion of the fourth power transmission mechanism 115a moves in the third linear direction, the fifth drive wheel 106e engages the first output shaft 104a and the fifth drive wheel 106e and the first output shaft 104a rotate in the first rotational direction. Rotation of the first output shaft 104a in the first rotational direction causes the third output wheel 120c to rotate in the first rotational direction. The third output wheel 120c is directly connected to the fifth shift gear 124e, which causes the fifth shift gear 124e to rotate in the second rotational direction. Since the fifth shift gear 124e is directly connected to the sixth shift gear 124f, the sixth shift gear 124f rotates in the first rotational direction. Since the sixth shift gear 124f is directly connected to the fourth output wheel 120d, the fourth output wheel 120d rotates in the second rotational direction. This causes the third output shaft 104c to rotate in the second rotational direction. If the third output shaft 104c is connected to a load 10, then work can be performed. Due to the first portion of the fourth power transmission mechanism 115*a* moving in the third linear direction, the sixth drive wheel 106*f* freewheels in the first rotational direction and does not affect the third output shaft 104*c*.

Conversely, when the first portion of the fourth power transmission mechanism 115*a* is moved in the fourth linear direction, the fifth drive wheel 106*e* freewheels and has no effect on the first output shaft 104*a*. Simultaneously, the sixth drive wheel 106*f* engages the third output shaft 104*c* and rotates the third output shaft 104*c* in the second rotational direction, which causes the fourth output wheel 120*d* to rotate in the second rotational direction. Since the fourth output wheel 120*d* is directly connected to the sixth shift gear 124*f*, the sixth shift gear 124*f* rotates in the first rotational direction. Since the sixth shift gear 124*f* is directly connected to the fifth shift gear 124*e*, the fifth shift gear 124*e* rotates in the second rotational direction. Since the fifth shift gear 124*e* is directly connected to the third output wheel 120*c*, the third output wheel rotates in the first rotational direction. Since the third output wheel 120*c* rotates with the first output shaft 104*a*, the first output shaft 104*a* rotates in the first rotational direction.

Therefore, whether the first portion of the fourth power transmission 115*a* is moving in the third linear direction or the fourth linear direction, the first output shaft 104*a* always rotates in the same direction (e.g. the first rotational direction). Similarly, whether the first portion of the fourth power transmission mechanism 115*a* is moving in the third linear direction or the fourth linear direction, the third output shaft 104*c* always rotates in the same direction (e.g. the second rotational direction).

In this configuration, a fourth lever arm 112*d* can be attached to the first portion of the fourth power transmission mechanism 115*a* via a fourth lever connector 114*d* to effectuate the linear movement of the first portion of the fourth power transmission mechanism 115*a*. The distance of the linear movement can be modified by changing the size of the fifth and sixth shift gears 124*e*, 124*f*. Alternatively, additional shift gears can be inserted in between the third and fourth output wheels 120*c*, 120*d*. Preferably, the number of additional shift gears should be an even number so that the first output shaft 104*a* and the third output shaft 104*c* rotate in opposite directions.

Like the first and second lever arms 112*a*, 112*b*, the second and third lever arms 112*c*, 112*d* may be configured to maximize economy of motion. For example, the third lever arm 112*c* may be defined by a third elongated body defining a third longitudinal axis 170*c* and having a third pivoting end 172*c* and a third free end 174*c* opposite the third pivoting end 172*c*. The third pivoting end 172*c* comprises a third pivoting slot 176*c* and is pivotably connected to the frame 102 (for example, at post 153*a*) at the third pivoting slot 176*c*, such that the third lever arm 112*c* can pivot about a pivoting axis 190 and can move bidirectionally along the third longitudinal axis 170*c* via the third pivoting slot 176*c*. The third free end 174*c* may comprise a third support 179*c* to improve the leverage at the third free end 174*c*.

A fourth lever arm 112*d* defined by a fourth elongated body defines a fourth longitudinal axis 170*d* and has a fourth pivoting end 172*d* and a fourth free end 174*d* opposite the fourth pivoting end 172*d*. The fourth pivoting end 172*d* comprises a fourth pivoting slot (not shown, but identical to the third pivoting slot 176*c* on the third lever arm 112*c*) and is pivotally connected to the frame 102 (for example, at post 153*b*) at the fourth pivoting slot such that the fourth lever arm 112*d* can pivot about the pivoting axis 190 and move bidirectionally along the fourth longitudinal axis 170*d* via the fourth pivoting slot. The fourth free end 174*d* comprises a fourth support 179*d*. Since the third and fourth lever arms 112*c*, 112*d* are able to move in the direction of their respective longitudinal axes 170*c*, 170*d* during the pivoting action at their respective pivoting ends 172*c*, 172*d*, the free ends 174*c*, 1174*d* can move along a linear pathway rather than the typical arcuate pathway that typical cranks arms traverse. Being able to move in a linear pathway allows the user to maximize the amount of force applied to the levers since none of the force is being applied in a wasted direction.

To further facilitate the linear directional movement of the third and fourth ends 174*c*, 174*d* of the lever arms 112*c*, 112*d*, crossbars 194*a*, 194*b* may function as a linear guide rail. The linear guide rails define a third guide slot 182*c* and a fourth guide slot 182*d*.

A third sliding guide 184*c* may be slidably mounted in the third guide slot 182*c*, the third sliding guide 184*c* operatively connected to the third lever arm 112*c* at a third connection point 186*c* in between the third free end 174*c* and the third pivoting end 172*c*. A fourth sliding guide 184*d* may be slidably mounted in the fourth guide slot 182*d*, the fourth sliding guide 184*d* operatively connected to the fourth lever arm 112*d* at a fourth connection point 186*d* in between the fourth free end 174*d* and the fourth pivoting end 172*d*. Therefore, from the third connection point 186*c* to the third free end 174*c*, the third lever arm 112*c* cannot move in the vertical direction. Rather any vertical movement of the third lever arm 112*c* in the direction of the third longitudinal axis 170*c* occurs at the third pivoting end 172*c* due to the third pivoting slot 176*c*. Similarly, from the fourth connection point 186*d* to the fourth free end 174*d*, the fourth lever arm 112*d* cannot move in the vertical direction. Rather any vertical movement of the fourth lever arm 112*d* in the direction of the fourth longitudinal axis 170*d* occurs at the fourth pivoting end 172*d* due to the fourth pivoting slot. The third lever arm 112*c* is also connected to the first portion of the third power transmission mechanism 113*a* by a third lever connector 114*c*, and the fourth lever arm 112*d* is connected to the first portion of the fourth power transmission mechanism 115*a* by a fourth lever connector 114*d*.

In use, the user can apply a specific amount of downward three on the first lever arm 112*a* and convert that force into rotational work on a load 10. Since application of the downward force on the second lever 112*b* also causes force to be applied to the load 10, the user is able to apply a continuous force on the load 10 by moving the first and second levers arms 112*a*, 112*b* in an upward and downward motion, for example, with his feet. Depending on the length of the lever arms 112*a*, 112*b*, the amount of force imparted on the load 10 can be greater than the amount of force the user applies to the lever arms 112*a*, 112*b*. The user can then begin using the third lever arm 112*c* (with his first hand) to impart additional force to the load 10. Since movement of the third lever arm 112*c* in either direction imparts force on the load 10, the load 10 will receive a continuous force from the third lever arm 112*c* when the third lever arm 112*c* is in motion. Finally, the user can use the fourth lever arm 112*d* (e.g. with his second hand) to further add to the three on the load. Since movement of the fourth lever arm 112*d* in either direction imparts force on the load, the load 10 will receive continuous force from the fourth lever arm 112*d* while the fourth lever arm 112*d* is in motion. Any of the lever arms 112*a-d* can be used in any combination to add to the amount of force applied on the load 10. In addition, the length of the lever arms, additional shift gears, the size of the gears, and the like can increase the amount of force on the load 10.

In the example shown in FIGS. 8A-8C, an output gear 199 is mounted on the first output shaft 104*a* to rotate with the first output shaft 104*a*. The output gear 199 can be connected to any load 10 or external device to create work. For example, the output gear 199 can be connected to wheels for transportation, a flywheel for exercise, a generator to generate electricity, or any other type of device to perform the type of work desired.

Numerous other variations can be achieved in light of this teaching. Additional output wheels, one-way bearings, output shafts, and shift gears can be used in a variety of combinations and a variety of positions for a variety of purposes. For example, output wheels, such as the first output wheel 120*a* and the third output wheel 120*c* can each have one-way bearings so that output wheels 120*a*, 120*b*, shift gears 124*c*, 124*d*, output wheels 120*c*, 120*d*, and shift gears 124*e*, 124*f*, are not moving when only levers 112*a*, 112*b* are in use.

In one example, the lever arm 112*a* may be 36 inches long. The length is to attach a roller chain type power transmission mechanism 110 for turning the drive wheel 180 degrees. This has worked out to be 16 inches from the fulcrum (pivot axis). The supports 179*a* 179*b*, such as foot pedals or hand grips, are close to the 36 inch distance to create a swing of approximately 13 inches. Those measurements are to be comparable to a bicycle crank device which has about a 6 inch diameter sprocket and a 13 inch diameter for the pedal rotation. This makes the sprocket/pedal ratio and the lever ratio both a little over 2 to 1. This lever arm 112*a* creates an arc of approximately 20 degrees over all, which gives an input at 95% and not the 100% true linear input. This problem is cured by creating the pivot slot 176*a* that is approximately 1.25 inches in length. This allows the lever arm 112*a* to move back from the top position to the middle, then past half way the lever pulls out and makes a smooth transition. This solution also goes along with the lever wanting to move toward the pivot point when moving toward 90 degrees and moving away from the pivot point when moving the lever away from the 90 degree point.

Preferably, a roller chain type power transmission mechanism 110 should attach directly to the lever arm 112*a*, which means the back side of the chain in most cases will need to go through the lever arm 112*a*. Using prototypes by attaching the lever to the roller chain, also including the lever sliding guide 184*a*, when pushing on a pedal under a heavy force, there is a twisting action which will cause incorrect wear on the roller chain and guide. The pedal itself should also be centered over the lever to eliminate twisting as opposed to projecting laterally to one side.

Figure 9A:
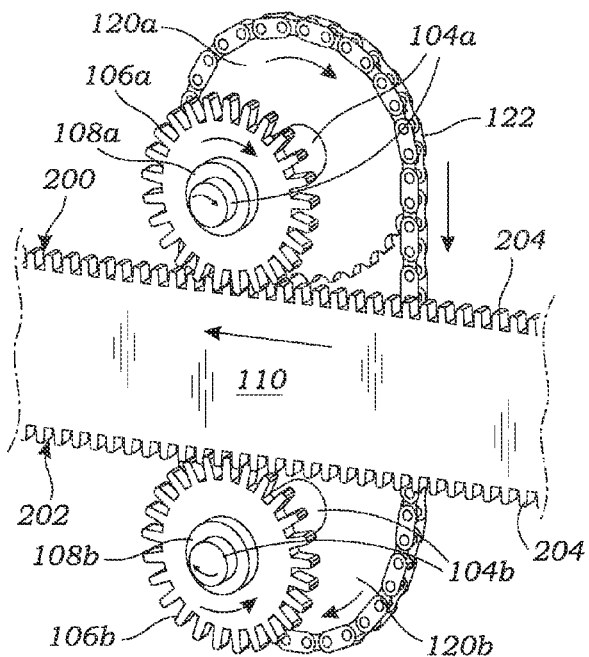
FIGS. 9A-9B show perspective views of another embodiment of the present invention.
Figure 9B:
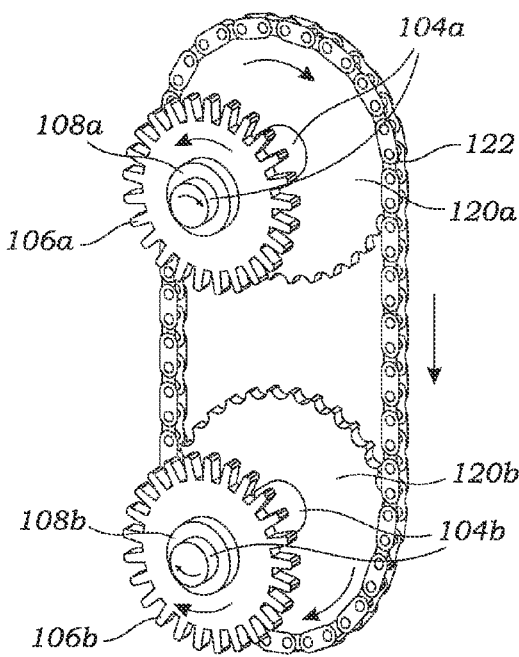

The power transmission mechanism 110 can be any device that can cause the drive wheel to rotate. As such, the power transmission mechanism 110 can be a flexible device, such as a belt, chain, band, and the like. The power transmission mechanism 110 can also be a rigid structure. For example, as shown in FIGS. 9A and 9B, the power transmission mechanism 110 is in the form of a rack having a first toothed side 200 and a second toothed side 202. Each toothed side 200, 202 is made of equally spaced teeth 204 that would match mated toothed drive wheels 106*a* and 106*b*. The number of teeth 204 on the power transmission mechanism 110 and mated drive wheel 106*a*, 106*b* would be determined by the application of the embodiment. As in other drive wheels described in this application, each drive wheel 106*a*, 106*b* has a one way bearing 108*a*, 108*b* that is connected to an output shaft 104*a*, 104*b*. Output wheels 120*a*, 120*b* may also be mounted on their respective output shafts 104*a*, 104*b* for rotation with their respective output shafts 104*a*, 104*b*. A transmission link 122, such as a chain or gear, may operatively connect the first output wheel 120*a* with the second output wheel 120*b*.

Operation of this embodiment is by the movement of the power transmission mechanism 110 in a first and second linear direction (left and right in the example shown). For example, as shown in FIG. 9A, when the power transmission mechanism 110 is moved in the first linear direction (e.g. to the left), the first drive wheel 106*a* rotates clockwise, which results in the one way bearing 108*a* engaging and rotating the output shaft 104*a* clockwise. Simultaneously, the second drive wheel 106*b* rotates counterclockwise. However, due to the orientation of the second one-way bearing 108*b*, with this direction of motion by the power transmission mechanism 110, the second drive wheel 106*b* freewheels and does not engage the second output shaft 104*b*. So with this first linear directional motion of the power transmission mechanism 110, output shaft 104*a* will rotate in the counterclockwise direction and output shaft 104*b* will remain unaffected.

Figure 10A:
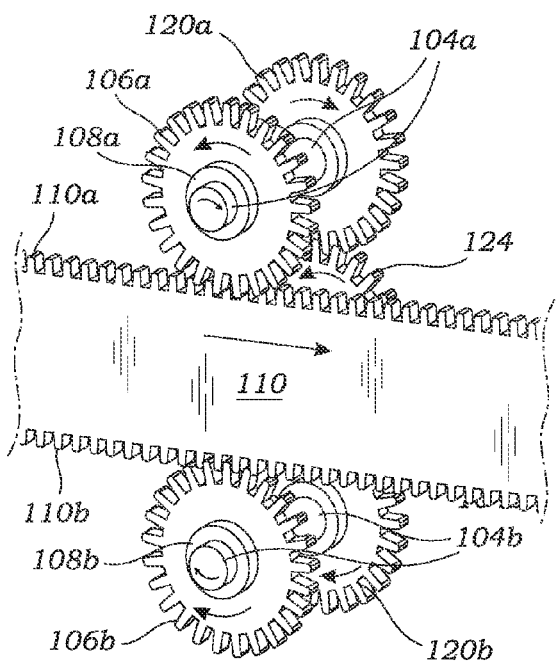
FIGS. 10A-10B show perspective views of another embodiment of the present invention.

Similarly, as shown in FIG. 10A, when the power transmission mechanism 110 is moved in the second linear direction (e.g. to the right) the opposite action occurs. The first drive wheel 106*a* will rotate counterclockwise, but due to the orientation of the first one-way bearing 108*a*, the rotation of drive wheel 106*a* will not engage the first output shaft 104*a*. With movement of the power transmission mechanism 110 in the second linear direction (e.g. to the right) the second drive wheel 106*b* rotates clockwise, and with the orientation of the second one-way bearing 108*b*, the second drive wheel 106*b* will engage the second output shaft 104*b*. So with the second directional motion of the power transmission mechanism 110, the second output shaft 104*b* rotates in the clockwise direction and the first output shaft 104*a* remains unaffected.

Figure 10B:
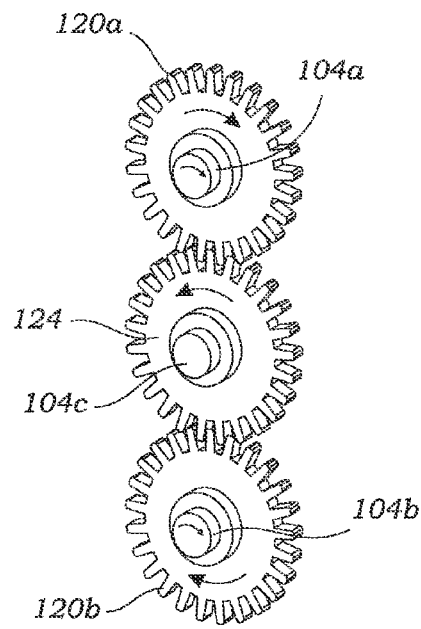

To allow bidirectional movement of the power transmission mechanism 110 to create rotational movement in both output shafts 104*a*, 104*b*, first and second output wheels 120*a*, 120*b* can be attached to the first and second output shafts 104*a*, 104*b*, respectively. The first and second output wheels 120*a*, 120*b* are operatively connected to each other with a transmission link 122. The transmission link 122 may be a chain, band, and the like as shown in FIGS. 9A and 9B, or the transmission link 122 may be a shift gear 124 as shown in FIGS. 10A and 10B. Each output wheel 120*a*, 120*b* is mounted on their respective output shaft 104*a*, 104*b* so as to rotate in the same direction as their respective output shaft 104*a*, 104*b*.

Therefore, when the power transmission mechanism 110 moves to the left, as shown in FIG. 9A, the first drive wheel 106*a* rotates clockwise. Due to the orientation of the first one-way bearing 108*a*, the first drive wheel 106*a* causes the first output shaft 104*a* to rotate in the clockwise direction. Rotation of the first output shaft 104*a* in a clockwise direction causes rotation of the first output wheel 120*a* in the clockwise direction. Due to the transmission link 122 connecting the first output wheel 120*a* to the second output wheel 120*b*, the second output wheel 120*b* also rotates in the clockwise direction. Since the second output wheel 120*b* is mounted on the second output shaft 104*b* so as rotate together, rotation of the second output wheel 120*b* in a clockwise direction causes the second output shaft 104*b* to rotate in the clockwise direction.

Meanwhile, even though movement of the power transmission mechanism 110 to the left causes rotation of the second drive wheel 106*b* in the counterclockwise direction, due to the orientation of the second one-way bearing 108*b*, the second drive wheel 106*b* is allowed to freewheel in that direction and not interfere with the rotation of the second output shaft 104*b* in the clockwise direction.

Similarly, as shown in FIG. 10A, movement of the power transmission mechanism 110 to the right causes rotation of the second drive wheel 106*b* in the clockwise direction. Due to the orientation of the second one-way bearing 108*b*, the second drive wheel 106*b* engages the second output shaft 104*b* to cause the second output shaft 104*b* to rotate in the clockwise direction. Rotation of the second output shaft 104*b* in the clockwise direction causes rotation of the second output wheel 120*b* in the clockwise direction. Since the second output wheel 120*b* is operatively connected to the first output wheel 120*a* via the transmission link 122, the first output wheel 120*a* also rotates in the clockwise direction. Since the first output wheel 120*a* is mounted on the first output shaft 104*a* and configured to rotate with the first output shaft 104*a*, the first output shaft 104*a* also rotates in the clockwise direction.

Meanwhile, even though movement of the power transmission mechanism 110 to the right causes rotation of the first drive wheel 106*a* in the counterclockwise direction, due to the orientation of the first one-way bearing 108*a*, the first drive wheel 106*a* is allowed to freewheel and not interfere with the rotation of the first output shaft 104*a* in the clockwise direction.

Therefore, in this arrangement, regardless of whether the power transmission mechanism 110 moves to the left or to the right, both output shafts 104*a*, 104*b* always rotate in the same direction (in this example, in the clockwise direction).

As with any of the other embodiments, levers or handles can be attached to the power transmission mechanism 110. Since the power transmission mechanism 110 is a solid shaft in this case, a powered linear input could also be applied to the power transmission mechanism 110 to cause rotational output. It is also possible for this embodiment to be mounted on a frame 102, in multiple positions for any application required.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A linear powered input device, comprising:
   a. a frame;
   b. a first output shaft rotatably mounted on the frame;
   c. a first drive wheel having a first one-way bearing mounted on the first output shaft, the first drive wheel defining a first plane of rotation and having a first diameter, the first one-way bearing operatively connected to the first drive wheel and the first output shaft such that rotation of the first drive wheel in a first rotational direction causes rotation of the first output shaft in the first rotational direction, and rotation of the first drive wheel in a second rotational direction opposite the first rotational direction does not cause rotation of the first output shaft in the second rotational direction;
   d. a first power transmission mechanism operatively connected to the first drive wheel such that a first portion of the first power transmission mechanism moving in a first linear direction causes the first drive wheel and the first output shaft to rotate in the first rotational direction, and the first portion of the power transmission mechanism moving in a second linear direction opposite the first linear direction, does not cause the first output shaft to rotate in the second rotational direction
   e. a second drive wheel having a second one-way bearing, the second drive wheel defining a second plane of rotation and having a second diameter, the second drive wheel arranged parallel to the first drive wheel and operatively connected to the first output shaft;
   f. a second power transmission mechanism operatively connected to the second drive wheel such that a first portion of the second power transmission mechanism moving in the first linear direction causes the second drive wheel and the first output shaft to rotate in the first rotational direction and the first portion of the second power transmission mechanism moving in the second linear direction does not cause the first output shaft to rotate in the second rotational direction;
   g. a first idler wheel operatively connected to the first power transmission mechanism;
   h. a first shift gear operatively connected to the first idler wheel;
   i. a second idler wheel operatively connected to the second power transmission mechanism; and
   j. a second shift gear operatively connecting the first shift gear to the second idler wheel such that rotation of the first shift gear causes rotation of the second shift gear in an opposite rotational direction.

2. The linear powered input device of claim 1, further comprising:
   a. a third drive wheel having a third one-way bearing, the third drive wheel operatively connected to the first output shaft;
   b. a third power transmission mechanism operatively connected to the third drive wheel, wherein the third power transmission mechanism is perpendicularly oriented relative to the first power transmission mechanism, such that movement of a portion of the third power transmission mechanism in a third linear direction perpendicular to the first linear direction causes rotation of the first output shaft in the first rotational direction.

3. The linear powered input device of claim 2, further comprising a fourth drive wheel having a fourth one-way bearing, the fourth drive wheel operatively connected to a second output shaft and the third power transmission mechanism, such that movement of the portion of the third power transmission mechanism in a fourth linear direction opposite the third linear direction causes rotation of the first output shaft in the first rotational direction.

4. The linear powered input device of claim 3, further comprising a first output wheel mounted on the first output shaft to rotate with the first output shaft, and a second output wheel mounted on the second output shaft to rotate with the second output shaft, wherein the first output wheel and the second output wheel are operatively connected to each other such that rotation of the first output wheel causes rotation of the second output wheel, and rotation of the second output wheel causes rotation of the first output wheel.

5. The linear powered input device of claim 4, further comprising a third shift gear directly connected to the first output wheel, and a fourth shift gear directly connected to the second output wheel and directly connected to the third shift gear.

6. The linear powered input device of claim 5, further comprising:
   a. a fifth drive wheel having a fifth one-way bearing, the fifth drive wheel mounted on the first output shaft;

b. a fourth power transmission mechanism operatively connected to the fifth drive wheel, wherein the fourth power transmission mechanism is perpendicularly oriented relative to the first power transmission mechanism, such that movement of a portion of the fourth power transmission mechanism in the third linear direction causes rotation of the first output shaft in the first rotational direction.

7. The linear powered input device of claim 6, further comprising a sixth drive wheel having a sixth one-way bearing mounted on a third output shaft, the sixth drive wheel operatively connected to the first output shaft and the fourth power transmission mechanism, such that movement of the portion of the fourth power transmission mechanism in the fourth linear direction opposite the third linear direction causes rotation of the first output shaft in the first rotational direction.

8. The linear powered input device of claim 7, further comprising a third output wheel mounted on the first output shaft to rotate with the first output shaft, and a fourth output wheel mounted on the third output shaft to rotate with the third output shaft, wherein the third output wheel and the fourth output wheel are operatively connected to each other such that rotation of the third output wheel causes rotation of the fourth output wheel, and rotation of the fourth output wheel causes rotation of the third output wheel.

9. The linear powered input device of claim 8, further comprising a fifth shift gear directly connected to the third output wheel, and a sixth shift gear directly connected to the fourth output wheel and directly connected to the fifth shift gear, such that rotation of the fourth output wheel in the second rotational direction causes rotation of the third output wheel in the first rotational direction.

\* \* \* \* \*